United States Patent
Nagashima et al.

(10) Patent No.: US 8,171,059 B2
(45) Date of Patent: May 1, 2012

(54) DATA MIGRATION MANAGEMENT APPARATUS AND MANAGEMENT METHOD

(75) Inventors: Yuichiro Nagashima, Fujisawa (JP); Akihiko Sakaguchi, Tachikawa (JP)

(73) Assignee: Hitachi, Ltd., Tokyo (JP)

( * ) Notice: Subject to any disclaimer, the term of this patent is extended or adjusted under 35 U.S.C. 154(b) by 323 days.

(21) Appl. No.: 12/490,038

(22) Filed: Jun. 23, 2009

(65) Prior Publication Data

US 2010/0274766 A1    Oct. 28, 2010

(30) Foreign Application Priority Data

Apr. 22, 2009   (JP) .................................. 2009-103625

(51) Int. Cl.
*G06F 7/00*    (2006.01)
(52) U.S. Cl. ........................................ 707/802; 709/201
(58) Field of Classification Search .................... 707/802
See application file for complete search history.

(56) References Cited

U.S. PATENT DOCUMENTS

| | | | |
|---|---|---|---|
| 2006/0047930 A1 | 3/2006 | Takahashi et al. | |
| 2008/0025235 A1* | 1/2008 | Mahany et al. | 370/256 |
| 2008/0091898 A1 | 4/2008 | Takahashi et al. | |
| 2008/0184068 A1* | 7/2008 | Mogi et al. | 714/15 |

FOREIGN PATENT DOCUMENTS

| | | |
|---|---|---|
| JP | 2006-099748 | 4/2006 |
| JP | 2006-343928 | 12/2006 |
| JP | 2007-109262 | 4/2007 |

* cited by examiner

*Primary Examiner* — Fazlul Quader
(74) *Attorney, Agent, or Firm* — Foley & Lardner LLP

(57) ABSTRACT

A data migration management apparatus continuously monitors and stores the utilization statuses of a migration-source storage area and a migration-destination storage area, and uses the information to set up a data migration. An information management unit collects information related to the storage configuration and information related to performance from respective storage apparatuses, and stores the information in a storage unit. In a case where a data migration plan is to be set, a performance information provision unit provides, to a user computer, variations in the utilization statuses during a predetermined period for each of a migration-source volume and a migration-destination array group.

10 Claims, 26 Drawing Sheets

FIG. 6

| APPARATUS INFORMATION ␣T10 | | | |
|---|---|---|---|
| C11 | C12 | C13 | C14 |
| APPARATUS ID | SERIAL NUMBER | MODEL NAME | POWER CONSUMPTION |
|  |  |  |  |
|  |  |  |  |
|  |  |  |  |

FIG. 7

| | ARRAY GROUP (AG) INFORMATION | | | | | | |
|---|---|---|---|---|---|---|---|
| C21 | C22 | C23 | C24 | C25 | C26 | C27 | C28 |
| AG-ID | AFFILIATED APPARATUS ID | SIZE | RAID CONFIGURATION | MAXIMUM PERFORMANCE VALUE | POWER CONSUMPTION | I/O CHARACTERISTIC | PERFORMANCE |
| | | | | | | | |
| | | | | | | | |
| | | | | | | | |

VOLUME (LU) INFORMATION — T30

| LU-ID (C31) | AFFILIATED AG-ID (C32) | AFFILIATED MG-ID (C33) | POWER CONSUMPTION (C34) | I/O CHARACTERISTIC (C35) | PERFORMANCE (C36) |
|---|---|---|---|---|---|
| | | | | | |
| | | | | | |
| | | | | | |

FIG. 9

| MIGRATION GROUP (MG) INFORMATION | | | | T40 |
|---|---|---|---|---|
| C41 | C42 | C43 | C44 | |
| MG-ID | POWER CONSUMPTION | PERFORMANCE | I/O CHARACTERISTIC | |
| | | | | |
| | | | | |
| | | | | |

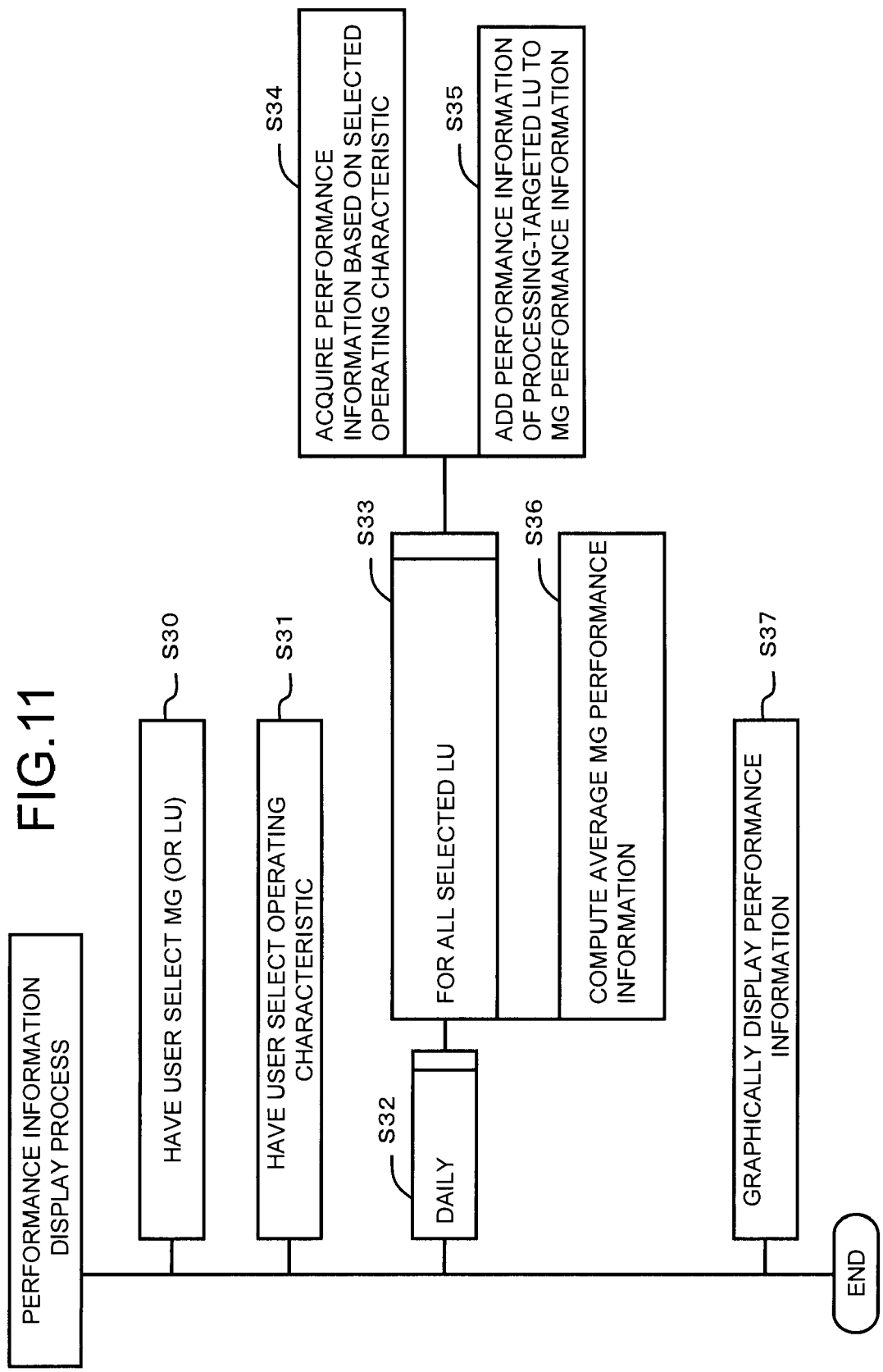

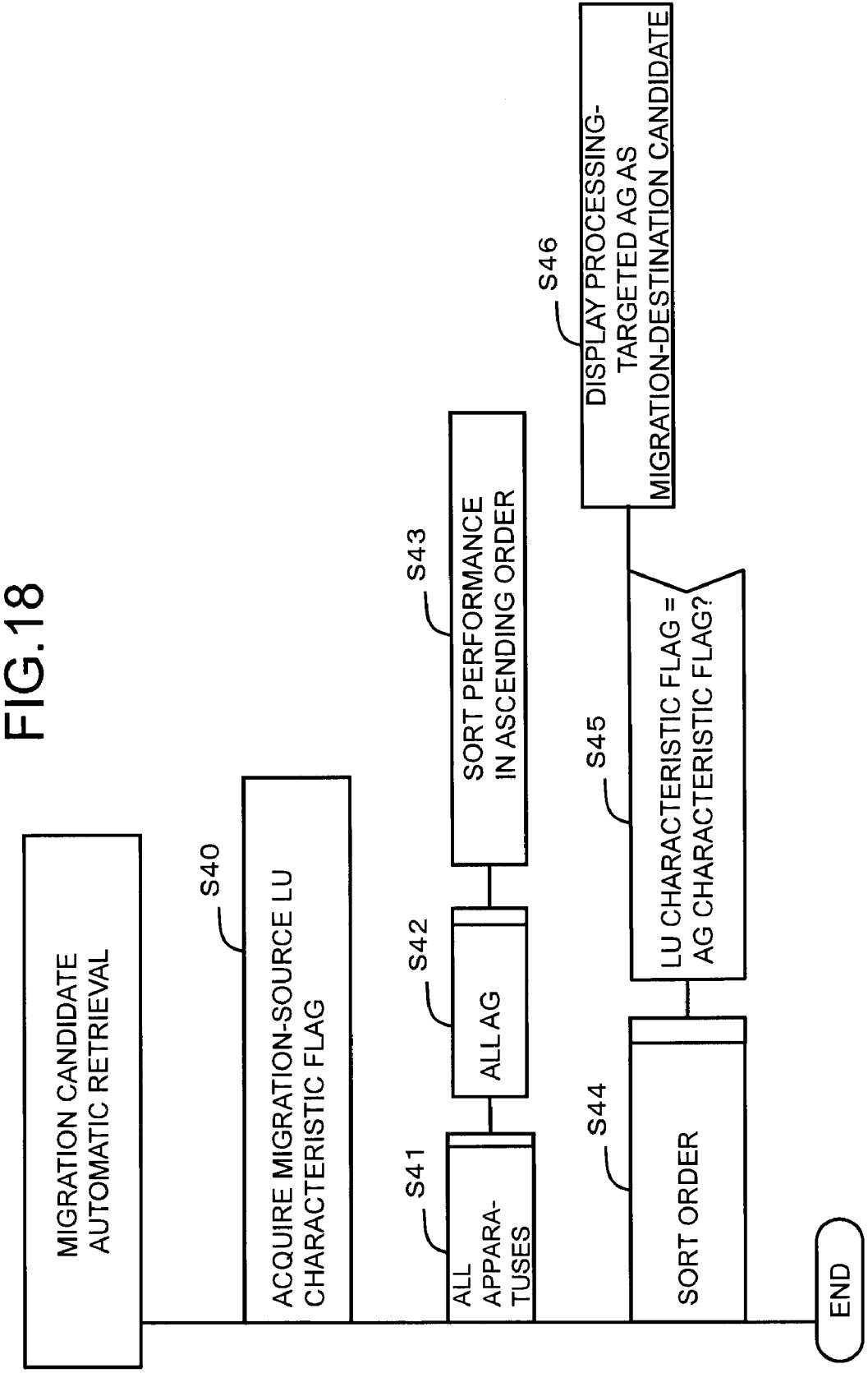

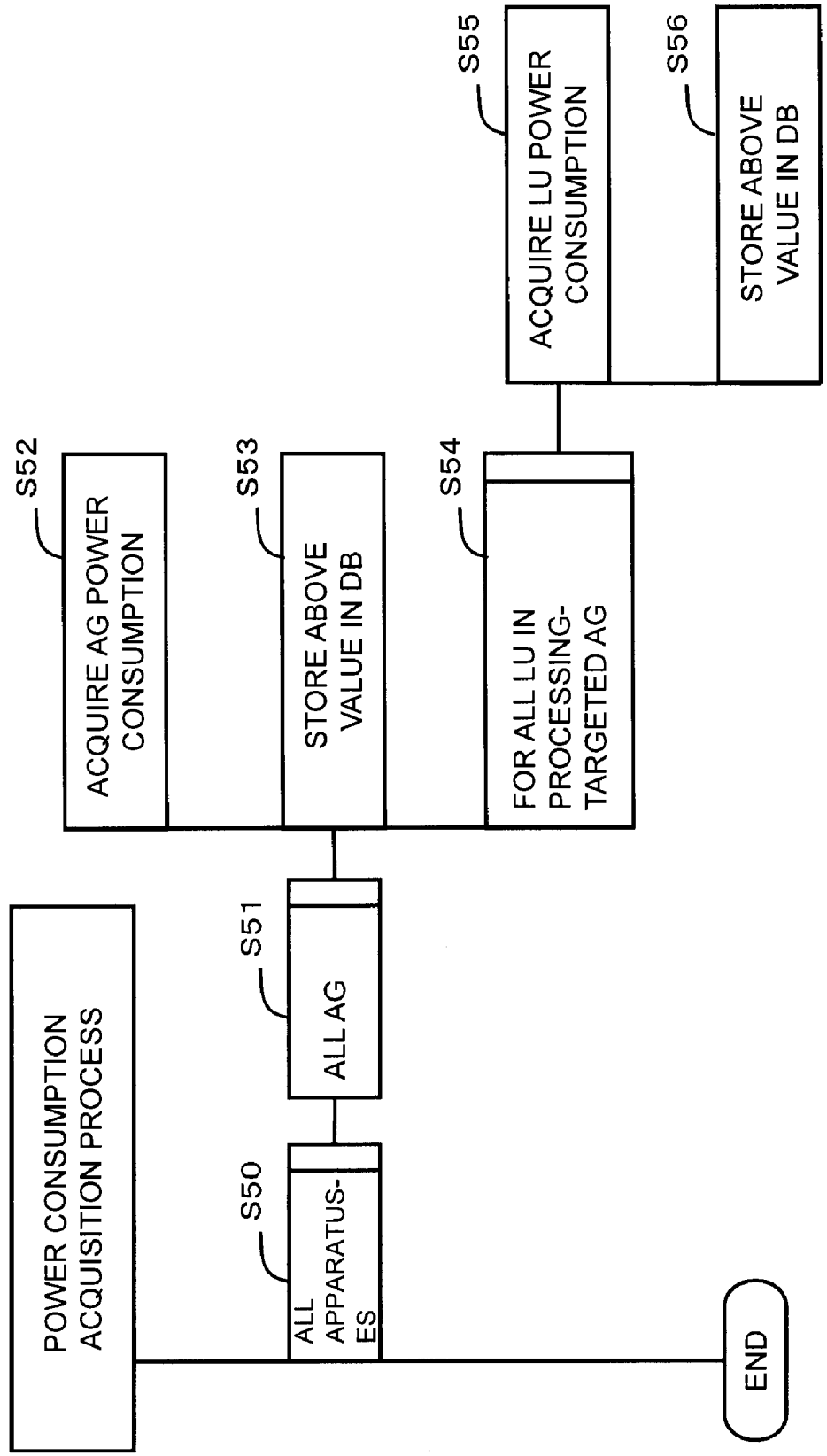

DATA MIGRATION MANAGEMENT APPARATUS AND MANAGEMENT METHOD

CROSS-REFERENCE TO RELATED APPLICATIONS

This application relates to and claims priority from Japanese Patent Application No. 2009-103625 filed on Apr. 22, 2009, the entire disclosure of which is incorporated herein by reference.

BACKGROUND OF THE INVENTION

1. Field of the Invention

The present invention relates to a data migration management apparatus and management method. A storage system provides a host computer with a redundant logical volume based on, for example, RAID (Redundant Array of Independent Disks). The system administrator and other users are able to move the location of the logical volume in accordance with, for example, the frequency with which the data is used (JP-A-2006-099748).

2. Description of the Related Art

In the prior art described in the above-mentioned patent document, a setup for a data migration (may also be shortened to migration hereinafter) is carried out based on information related to the volume load at a certain instant. However, the state of usage of the logical volume, for example, varies dynamically in accordance with the type of data stored in this logical volume, and the type of host application program using this logical volume. Therefore, it is not possible to determine a migration-targeted logical volume or a migration-destination array group (RAID Group) and carry out a suitable data migration based solely on the momentary load information at a certain point in time.

For example, even in the case of an array group for which the load is relatively high during the day, the load value may unexpectedly drop for a short period of time. In a case where a different logical volume is migrated into the array group based on this low load value that was measured by chance, the average load of the array group will further increase and response performance will drop.

Further, the prior art does not touch on the aspect of power consumption reduction at data migration execution. For example, migrating a logical volume that is frequently used during the daytime into an array group having another logical volume that is accessed frequently at night will result in the respective hard disk drives that configure this array group operating continuously day and night. Therefore, the time during which power can be shut off to the hard disk drives inside this array group is shortened and power consumption increases. The life of the hard disk drive is also affected.

SUMMARY OF THE INVENTION

Accordingly, an object of the present invention is to provide a data migration management apparatus and management method that make it possible to suitably setup a data migration in accordance with detecting and providing the user with variations in the utilization status of a prescribed storage area at a predetermined period of time. Another object of the present invention is to provide a data migration apparatus and management method that make it possible to automatically retrieve a suitable migration destination storage area. Yet other objects of the present invention should become clear from the description of the embodiment given hereinbelow.

To solve for the above-mentioned problems, a data migration management apparatus according to a first aspect of the present invention is for managing a data migration in a storage system comprising a plurality of storage areas, and comprises an interface for coupling to the storage system; a memory for storing a database that stores utilization status information indicating the utilization status of the plurality of storage areas, which is acquired via the interface; and a processor for referencing the database, and, based on the utilization status information managed by an information management unit, the processor detects variations in the utilization status for a predetermined period in a prescribed storage area related to the data migration of the respective storage areas, and provides these variations in the utilization status to a user computer used by a user via the interface, and then the processor manages the data migration based on a setting value inputted from the user computer via the interface.

In a second aspect according to the first aspect, at least one of a migration-source storage area to be a data migration source, and a migration-destination storage area to be a data migration destination, can be selected as the prescribed storage area, and the processor detects variations in the utilization status during the predetermined period in the storage area selected by the user computer from among the migration-source storage area and the migration-destination storage area, and provides these variations in the utilization status to the user computer via the interface.

In a third aspect according to the second aspect, the processor compares migration-source status variations which indicate variations in the utilization status during the predetermined period for the migration-source storage area, with migration-destination status variations which indicate variations in the utilization status during the predetermined period for the migration-destination storage area, and provides the results of the comparison to the user computer via the interface.

In a fourth aspect according to the third aspect, the processor provides migration-source status variations and migration-destination status variations to the user computer to enable these variations in status to be displayed and compared on the same screen of the user computer.

In a fifth aspect according to the first aspect, the predetermined period can be selected from among a plurality of time periods prepared in advance, and the processor detects variations in the utilization status during the period selected by the user computer from among the plurality of periods, and provides these variations in the utilization status to the user computer via the interface.

In a sixth aspect according to the first aspect, the utilization status information comprises loads of the storage areas.

In a seventh aspect according to the sixth aspect, the utilization status information also comprises access characteristics of the storage area.

In an eighth aspect according to the sixth aspect, the utilization status information also comprises the power consumption of the respective storage areas, and a microprocessor analyzes variations in power consumption in a prescribed storage area during a predetermined period, and provides the results of the analysis to the user computer via the interface.

In a ninth aspect according to the first aspect, a group comprising a plurality of storage areas can be selected as the prescribed storage area, and a microprocessor provides, to the user computer via the interface, the variations in utilization status during a predetermined period for the storage areas included in the group as a whole, and the variations in the utilization status during the predetermined period for each of the storage areas included in the group.

In a tenth aspect according to the third aspect, a microprocessor retrieves a candidate capable of becoming the migration-destination storage area among the storage areas based on the migration-source status variation and the migration-destination status variation, and provides the candidate to the user computer.

In an eleventh aspect according to the tenth aspect, the utilization status information comprises loads of the storage areas and access characteristics of the storage area, and the microprocessor retrieves the candidate in ascending load order among a plurality of storage areas having access characteristics that match the access characteristics of the migration-source storage area.

In a twelfth aspect, in a case where a plurality of migration-destination storage areas exist, a microprocessor retrieves the candidate such that the access characteristics of the respective migration-destination storage areas are dispersed.

A data migration management method according to a thirteenth aspect is for managing a data migration in a storage system comprising a plurality of storage areas, and acquires utilization status information indicating utilization status of a plurality of storage areas, stores and manages the utilization status information in a database, detects, based on the utilization status information, variations in the utilization status during a predetermined time in a prescribed storage area related to the data migration of the storage areas, provides the detected variations in the utilization status to a user computer used by a user, and manages the data migration on the basis of a setting value inputted from the user computer.

Either all or a portion of the functions, means and steps of the present invention may be configured as a computer program. This computer program may be transferred via a communication network such as the Internet in addition to being stored on and delivered in the form of a recording medium. Furthermore, the characteristic features described above may be combined into a combination other than those disclosed, and such a combination is also included within the scope of the present invention.

BRIEF DESCRIPTION OF THE DRAWINGS

FIG. 6 is a diagram showing the configuration of apparatus information;

FIG. 7 is a diagram showing the configuration of array group information;

FIG. 8 is a diagram showing the configuration of volume information;

FIG. 9 is a diagram showing the configuration of migration group information;

FIG. 11 is a PAD diagram showing the process for displaying performance information;

FIG. 18 is a PAD diagram showing the process for automatically retrieving a migration destination candidate;

FIG. 19 is a PAD diagram showing the power consumption acquisition process executed by the data migration management apparatus related to a third embodiment;

DESCRIPTION OF THE PREFERRED EMBODIMENTS

The embodiments of the present invention will be explained below on the basis of the drawings. In this embodiment, as is described hereinbelow, the storage area utilization status is continuously measured and used to set up a data migration.

Figure 1:
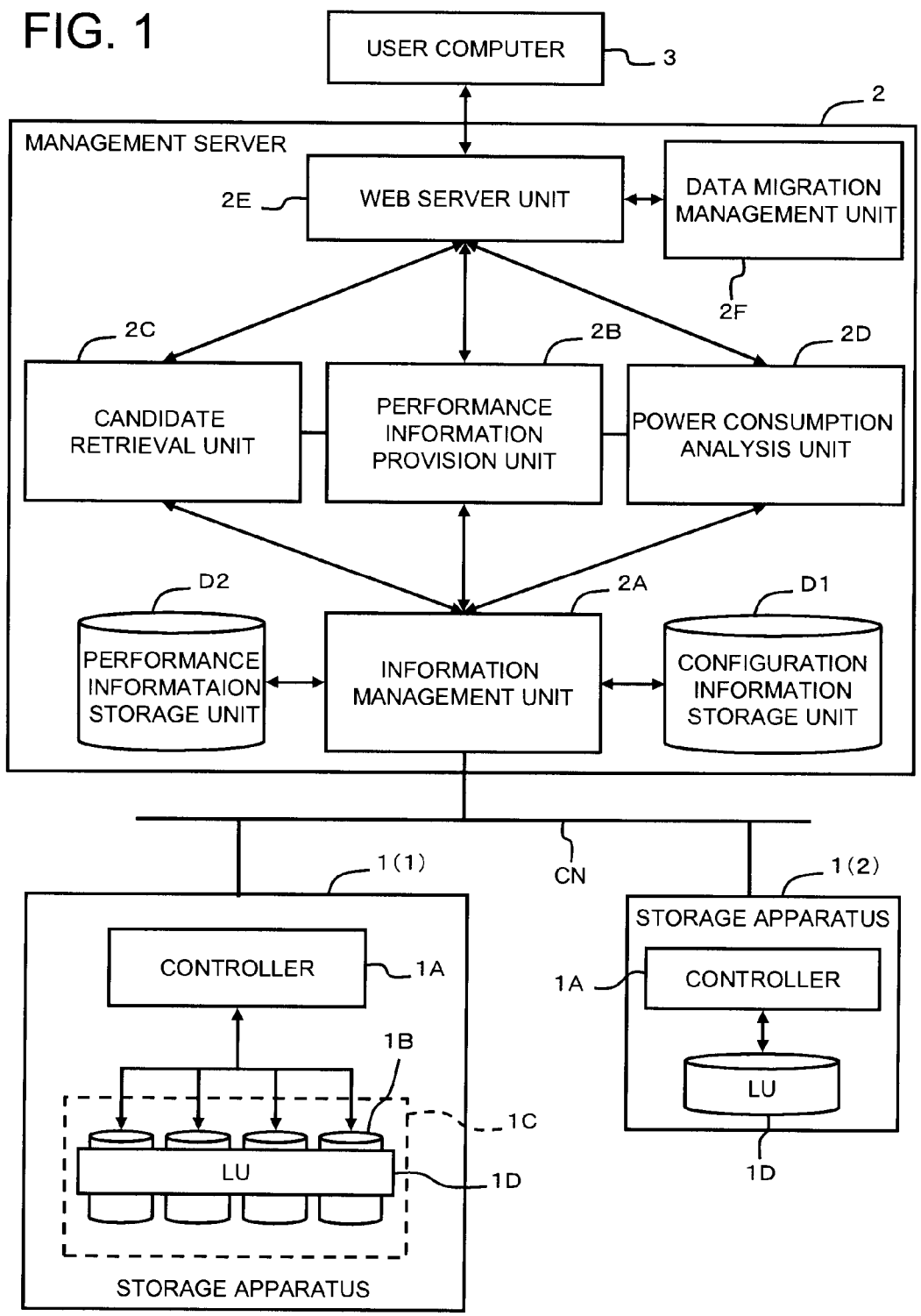
FIG. 1 is a schematic diagram showing an overview of an embodiment of the present invention.

FIG. 1 is a schematic diagram showing the overall concept behind this embodiment. This system, for example, comprises a plurality of storage apparatuses 1(1), 1(2), at least one management server 2, and at least one user computer 3.

The storage apparatuses 1(1), 1(2), for example, comprise a controller 1A, a plurality of storage devices 1B, an array group 1C, and a logical volume 1D. The controller 1A controls the configuration and operation of the storage apparatus. When there is no particular need to distinguish between them, the storage apparatuses 1(1), 1(2) will be called storage apparatuses 1.

As a storage device 1B, for example, a hard disk device, a semiconductor memory device, an optical disk device, a magneto-optical disk device, a magnetic tape device, a flexible disk device, or another device that is capable of reading and writing data may be used.

When a hard disk device is used as the storage device 1B, for example, it is possible to use a FC (Fibre Channel) disk, a SCSI (Small Computer System Interface) disk, a SATA disk, an ATA (AT Attachment) disk, or a SAS (Serial Attached SCSI) disk. Further, for example, a flash memory, FeRAM (Ferroelectric Random Access Memory), MRAM (MagnetoresistiveRandom Access Memory), Ovonic Unified Memory, RRAM (Resistance RAM) or other storage device may also be used. In addition, for example, a configuration that mixes together different types of storage devices, such as a flash memory device and a hard disk drive, is also possible.

The array group 1C is configured by grouping together the physical storage areas of a plurality of storage devices 1B. A logical volume (LU: Logical Unit in the figure) 1D is provided by using the storage area of the array group 1C. The logical volume 1D is provided to a not-shown host computer by being made correspondent to a communication port of the controller 1A.

The management server 2, which serves as the "data migration management apparatus", collects and stores the utilization status of each of the plurality of storage areas 1C, 1D of the respective storage apparatuses 1, and provides this collected information to the user computer 3 that is used by the user in either processed form or as-is. In the following explanation, the array group 1C and the logical volume 1D may be expresses as the "storage areas 1C, 1D" for the sake of expediency.

The management server 2, for example, comprises an information management unit 2A, performance information provision unit 2B, a candidate retrieval unit 2C, a power consumption analysis unit 2D, a web server unit 2E, a migration management unit 2F, a configuration information storage unit D1, and a performance information storage unit D2.

The information management unit 2A continuously collects performance information indicating the utilization status of each of the storage areas 1C, 1D of the respective storage apparatuses 1, and stores this collected information in the performance information storage unit D2 as a "database".

The "utilization status", for example, may include the storage area load. The storage area load, for example, may be computed based on the access frequency (frequency at which read requests and write requests are issued to this storage area) and data size per access. In this embodiment, the "utilization status information" will be explained by giving as an example information that denotes the performance (load) of a storage area. The performance information is stored in the performance information storage unit D2. The configuration information storage unit D1 stores information related to the configurations of the respective storage apparatuses 1. Configuration-related information, for example, comprises the configuration of the array group 1C and the configuration of the logical volume 1D.

The performance information provision unit 2B detects variations in the utilization status during a predetermined period for the prescribed storage areas 1C, 1D related to a data migration based on the performance information of a plurality of points in time stored in the performance information storage unit D2. The performance information provision unit 2B provides the variations in the utilization status within the predetermined period to the user computer 3 via the web server unit 2E.

The "predetermined period", for example, may be given in units of several hours, daily units, weekly units or monthly units. In this embodiment, variations in performance are detected in either daily or half-day units and provided to the user computer 3. Although there will be differences in accordance with the type of application program that is using the logical volume 1D, there is a logical volume 1D that is used during daytime business hours and a logical volume 1D that is used during the nighttime after business hours. Therefore, detecting variations in performance in either a logical volume 1D or an array group 1C over the span of a half-day or a full day makes it possible to determine how the logical volume 1D or array group 1C is being used. This method of utilization will be called the operating characteristic in the embodiment described hereinbelow.

The candidate retrieval unit 2C retrieves a suitable array group 1C candidate to serve as the migration destination based on a variation in performance (a variation in the utilization status) in a migration-source logical volume 1D, and a variation in performance in the respective array groups 1C that are able to be selected as the migration destination.

For example, the candidate retrieval unit 2C extracts either one or a plurality of array groups 1C that have access characteristics that match the access characteristics of the migration-source logical volume 1D. The candidate retrieval unit 2C determines whether or not a candidate has free space that is larger in size than the migration-source logical volume 1D, and whether or not the performance value (load value) is less than a predetermined value for each extracted array group 1C. Then, the candidate retrieval unit 2C retrieves as a migration-destination candidate an array group 1C that has access characteristics that match those of the migration-source logical volume 1D and has the required free space size, and, in addition, that is being used at a load that is less than the predetermined value. An access characteristic signifies the characteristic feature of accesses, such as more random accesses or more sequential accesses. A migration-destination candidate that is retrieved like this is provided to the user computer 3 by way of the web server unit 3.

The power consumption analysis unit 2D may operate in conjunction with the performance information provision unit 2B. Information related to the power consumption of the respective storage areas 1C, 1D is collected and stored either as a portion of the performance information or separate from the performance information. The power consumption analysis unit 2D detects the power consumption of the respective storage areas 1C, 1D and computes a variation in power consumption based on the stored information. The variation in power consumption is provided to the user computer 3 via the web server unit 2E. Furthermore, the power consumption analysis unit 2D is able to predict and display the power consumption in a case where a data migration has been executed.

The web server unit 2E displays a data migration setup screen on the user computer 3. The data migration management unit 2F manages the execution of a data migration based on the setting value inputted via the web server unit 2E.

Furthermore, the drawing has been omitted, but the management server 2 is configured from a processor, a memory (configured from a storage device such as a semiconductor memory and/or a HDD), and one or more interfaces that are connected to either the user computer 3 or the storage apparatuses 1, and either send or receive information. The information storage unit of the management server 2 described above is stored in the above-mentioned memory. Similarly, the respective units, which have been described as units in the above explanation but will be described as processes in the following explanation, are realized by the above-mentioned processor executing a management program stored in the above-mentioned memory. In the following explanation, explanations are provided using the management server 2, respective units and respective functions as subjects, but these may be substituted for one another, and the processor can also be considered as the subject. Also, unless otherwise stated, information acquisition (reception) by the management server 2 targeted at the storage apparatuses or the user computer, and the sending of instructions and display information are by way of the pertinent interface.

Furthermore, the data structures (tables, database) of the various types of information of the management server 2 shown hereinbelow are only examples, and any type of data structure may be employed.

Furthermore, the management server 2 may also integrate the functions of the user computer. The programs, which are stored in the memory of the management server 2 and which realize the respective units, may be stored on a storage medium. In accordance with this, the management server 2 realizes the invention of the subject application by copying (or installing) the programs from this storage medium.

Configuring this embodiment like this achieves the following effect. In this embodiment, the performance information of the respective logical volumes 1D and respective array groups 1C is collected and stored, and then when a data migration is set up, a variation in the performance information during a predetermined period is provided to the user computer. Therefore, the user is able to select a more suitable migration destination on the basis of the variation in performance during the predetermined period.

In this embodiment, being able to automatically retrieve a suitable candidate to serve as the migration destination enhances user usability.

In this embodiment, collecting information on power consumption and providing this collected information to the user computer 3 makes it possible for the user to set up a data migration by paying attention to variations in power consumption. Therefore, it is possible to carry out a data migration such that the power consumption of the storage apparatuses 1 is reduced, enabling lower operating costs for the entire system. This embodiment will be explained in detail hereinbelow.

[First Embodiment]

Figure 2:
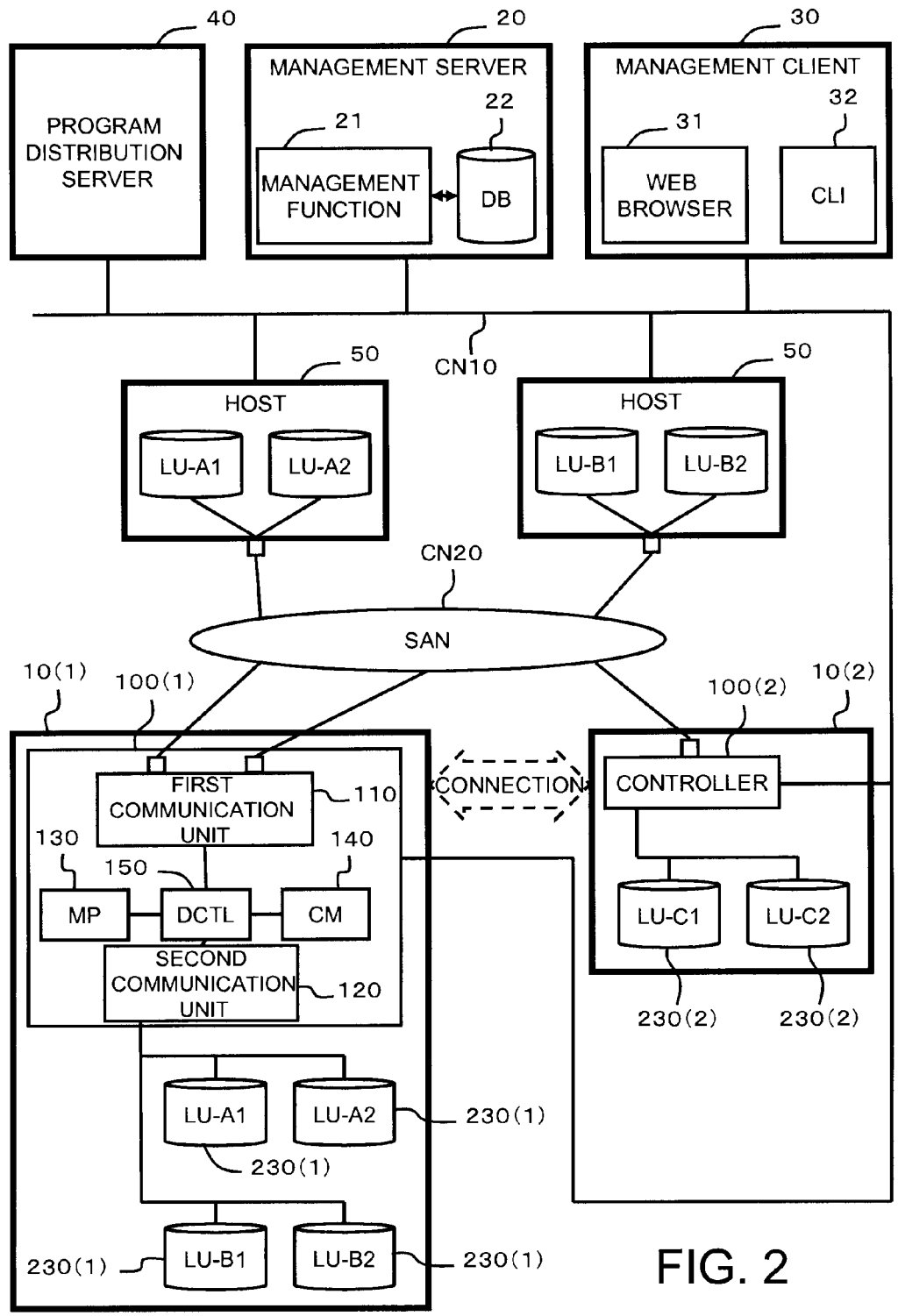
FIG. 2 is a block diagram showing the overall configuration of a system.

The first embodiment will be explained based on FIGS. 2 through 16. FIG. 2 is a schematic diagram showing the configuration of the entire system. First, the relationship to the configuration shown in FIG. 1 will be described. A storage apparatus 10 corresponds to the storage apparatus 1, a management server 20 corresponds to the management server 2, a management client 30 corresponds to the user computer 3, and a controller 100 corresponds to the controller 1A. Furthermore, a storage device 210 corresponds to the storage device 1B, an array group 220 (refer to FIG. 3) corresponds to the array group 1C, and a logical volume 230 corresponds to the logical volume 1D. A storage configuration management function 21A (refer to FIG. 5) corresponds to the information management unit 2A, a performance information management function 21C (refer to FIG. 5) corresponds to the performance information provision unit 2B, a migration management function 21B (refer to FIG. 5) corresponds to the candidate retrieval unit 2C and migration management unit 2F, and a storage management information database 22 (refer to FIG. 5) corresponds to the configuration information storage unit D1 and the performance information storage unit D2. Or, the performance information management function 21C may also be made to correspond to both the information management unit 2A and the performance information provision unit 2B.

Referring to the diagram of the overall system of FIG. 2, this system, for example, comprises a plurality of storage apparatuses 10(1), 10(2); at least one management server 20; at least one management client 30; at least one program distribution server 40; and at least more than one host computer 50 (host 50 hereinafter).

The respective storage apparatuses 10(1), 10(2) fundamentally may be formed as apparatuses of substantially the same configuration. When there is no particular need to distinguish between the storage apparatuses 10(1), 10(2), they will be called the storage apparatuses 10.

This configuration will be explained by giving storage apparatus 10(1) as an example. The storage apparatus 10(1), for example, comprises a controller 100(1) and a plurality of logical volumes 230(1).

The controller 100(1) controls the operation of the storage apparatus 10(1). For example, the controller 100(1) either writes data to a targeted logical volume 230(1) or reads data from the targeted logical volume 230(1) in accordance with a command issued from the host 50. Furthermore, the controller 100(1) implements various types of processing (for example, the creation of a logical volume, the copying of data between logical volumes, and so forth) for a data migration in accordance with an instruction from the management server 20.

The controller 100(1), for example, comprises a first communication unit 110; a second communication unit 120; a microprocessor 130; a cache memory 140; and a data transfer control circuit 150.

The first communication unit 110 is a control circuit for controlling communications between the host 50 and the other storage apparatus 10(2). The first communication unit 110, for example, is connected to the host 50 and the other storage apparatus 10(2) by way of an I/O (Input/Output) communication network CN10 such as an IP-SAN (Internet Protocol-Storage Area Network) or a FC-SAN (Fibre Channel-SAN).

For example, the initiator ports of the respective hosts 50 are connected to a plurality of target ports in the first communication unit 110, and the target port of the other controller 100(2) of the other storage apparatus 10(2) is connected to the initiator port of the first communication unit 110.

The second communication unit 120 is a control circuit for carrying out communications with the respective storage devices 210 configuring the respective logical volumes 230(1). The second communication unit 120 is connected to the respective storage devices 210 via a plurality of communication paths. Therefore, even if one communication path should fail, access to the storage device 210 is possible via the other communication path.

The microprocessor (MP in the figure) 130 is a control circuit for controlling the operation of the controller 100(1). The microprocessor 130 issues a predetermined instruction based on a command received from either the host 50 or the management server 20.

The cache memory 140 is for storing write data. One area of the cache memory 140 is used as a cache area, and write data and the like is stored therein. The other area of the cache memory 140 is used as a control information area, and control information and management information are stored therein.

The data transfer control circuit 150 is a circuit for interconnecting the respective communication units 110, 120, the microprocessor 130 and the cache memory 140. The other storage apparatus 10(2) also comprises a controller 100(2) and a logical volume 230(2) the same as the one storage apparatus 10(1).

The management server 20 is for managing the configuration and operation of the system. In this embodiment, the management server 20 in particular manages a data migration within the system. The management server 20, for example, is connected to the respective storage apparatuses 10, the respective hosts 50, the management client 30, and the program distribution server 40 by way of a management communication network CN10 such as a LAN (Local Area Network). The management server 20 comprises a management function 21 and a database 22. The configuration of the management server 20 will be explained in detail further below using FIG. 5.

The management client 30 is for issuing instructions to the management server 20. The management client 30, for example, comprises a web browser 31 and a CLI (Command Line Interface) 32. The management client 30, for example, comprises input devices, such as a keyboard switch and pointing device, and output devices such as a display device and a printer (none of which is shown in the figure). The various types of information sent from the management server 20 may be displayed on the terminal screen of the management client 30 or outputted as printed matter. The user devises a data migration plan based on the information obtained from the management server 20, and inputs a setting for implementing this plan to the management server 20.

The program distribution server 40, for example, is for distributing the program products of the invention of the subject application to the management server 20. The system does not necessarily require the program distribution server 40. Also, the program distribution server 40 may exist external to the system of the invention of the subject application.

The respective hosts 50 provide various types of work processing services to client computers not shown in the drawing by using the logical volumes inside the storage apparatuses 10. The respective hosts 50 are connected to respective client computers via a communication network like the Internet (not shown in the drawing), and are also connected to the respective storage apparatuses 10 via a communication network CN20. The host 50 is also connected to the management server 20 via the management communication network CN10.

Figure 3:
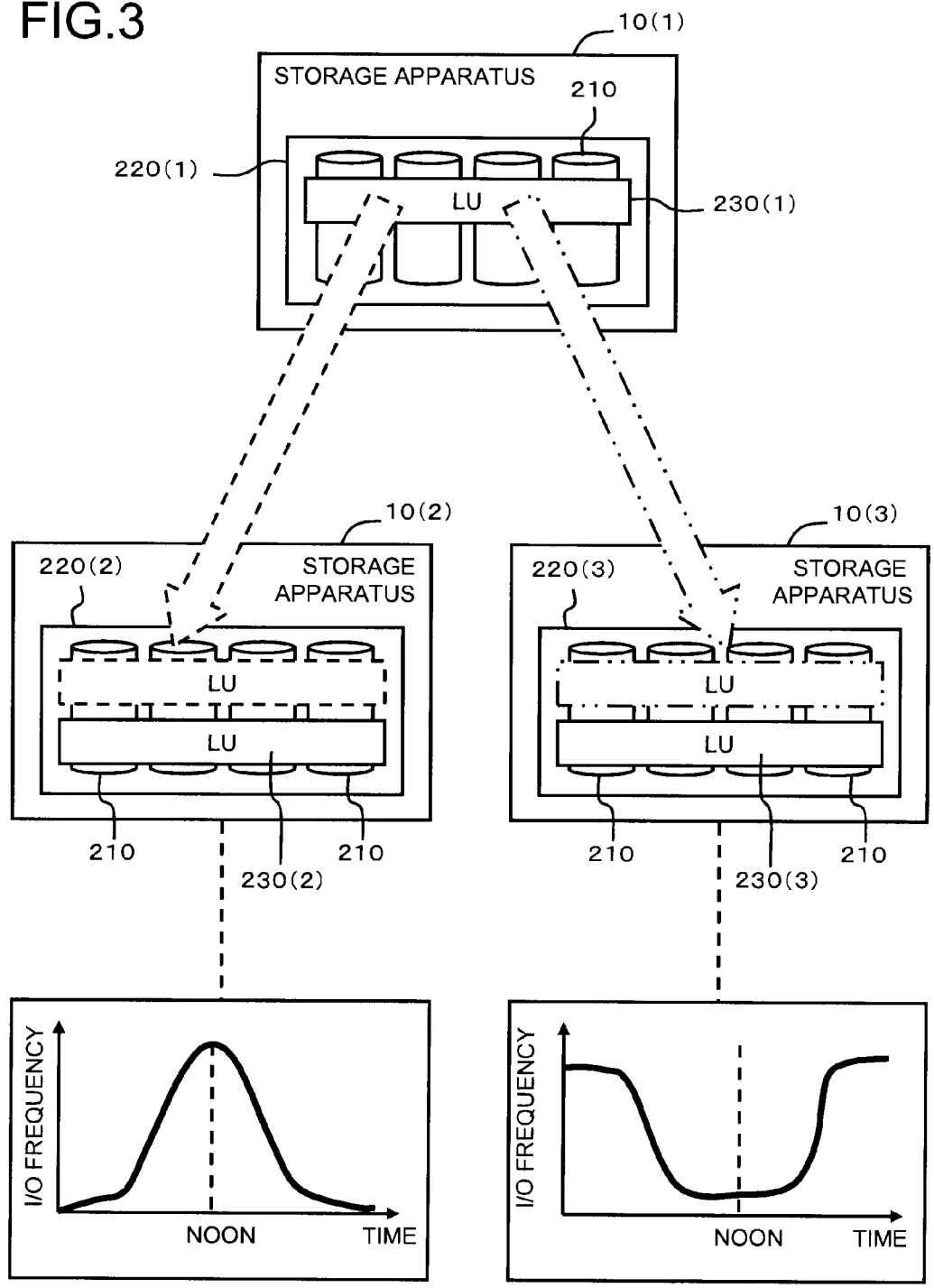
FIG. 3 is a diagram schematically showing a data migration.

FIG. 3 is a schematic diagram showing an overview of a data migration. In FIG. 3, three storage apparatuses 10(1), 10(2) and 10(3) are shown. The present invention is not limited to this, and is also applicable in a case where a data migration is executed inside a single storage apparatus 10, as well as in a case where a data migration is executed inside a system comprising four or more storage apparatuses.

As shown in the upper portion of FIG. 3, the physical storage areas of a plurality of storage devices 210 disposed in the storage apparatus 10(1) are brought together into a single array group 220(1), and a logical volume 230(1) is disposed in the storage area of this array group 220(1). Similarly, array groups 220(2), 220(3) and logical volumes 230(2), 230(3) are also disposed in the other storage apparatuses 10(2), 10(3).

The bottom portion of FIG. 3 shows how the respective array groups 220(2), 220(3) are used. First, look at the array group 220(2) of the storage apparatus 10(2) on the left side. The logical volume 230(2) in the array group 220(2) is accessed with relatively high frequency from the host 50 during daytime hours, and the nighttime access frequency is low. In contrast to this, in the array group 220(3) of the storage apparatus 10(3) on the right side, access frequency is low during the daytime and high during the nighttime. This is because the logical volume 230(3) in the array group 220(3) is used for batch processing at night.

In this way, the method of using (utilization status of) the array groups 220 will differ according to the nature of the data stored in the logical volume 230 disposed therein, and the type of application program that uses this data.

A case where the logical volume 230(1) inside the storage apparatus 10(1) is the migration target will be explained. The migration-destination candidates are array group 220(2) and array group 220(3). If the migration-source volume 230(1) is accessed frequently during the daytime the same as the logical volume 230(2), the migration-source volume 230(1) is arranged in the array group 220(2) having a high daytime utilization frequency. By contrast, if the migration-source volume 230(1) is accessed frequently during the nighttime the same as the logical volume 230(3), the migration-source volume 230(1) is arranged in the array group 220(3) having a high nighttime utilization frequency.

Bringing logical volumes 230 with similar access frequency trends together into a single array group 220 makes it possible to shorten the operating time and reduce the power consumption of the respective storage devices 210 that configure this array group 220. By shutting off the power to storage devices 210 that have not been accessed for a fixed period of time, which is known as MAID (Massive Arrays of Inactive Disks), it is possible to lessen the power consumption of storage devices 210. Therefore, grouping logical volumes 230 with similar utilization trends into a single array group 220 enables the operating times of the respective storage devices 210 configuring this array group 220 to be made uniform, making it possible to lengthen idle time.

If logical volumes 230 having completely different utilization trends are arranged in a single array group 220, the respective storage devices 210 configuring this array group 220 will operate all day long, shortening idle time. Therefore, the time during which the power to the respective storage devices 210 is shut off becomes short, making it impossible to reduce power consumption.

For the reasons described above, in this embodiment, a data migration setting is made so that logical volumes 230 with similar utilization trends (in other words, variations in performance during a predetermined period) are arranged into a single array group 220.

However, it is preferable that array groups 220 having different utilization trends be suitably intermixed within the storage apparatuses 10. For example, in a case where only logical volumes 230 with high daytime access frequencies are grouped inside a single storage apparatus 10, the communication ports of the controller 100 become congested, and daytime response performance decreases. By contrast, in a case where only logical volumes 230 with high nighttime access frequencies are grouped inside a single storage apparatus 10, nighttime communications increase, decreasing response performance. When array groups 220 having different utilization trends are suitably intermixed, it is possible to reduce the likelihood of communication port bandwidth becoming a bottleneck, enabling the response performance of the storage apparatus 10 to be maintained at a high level.

Figure 4:
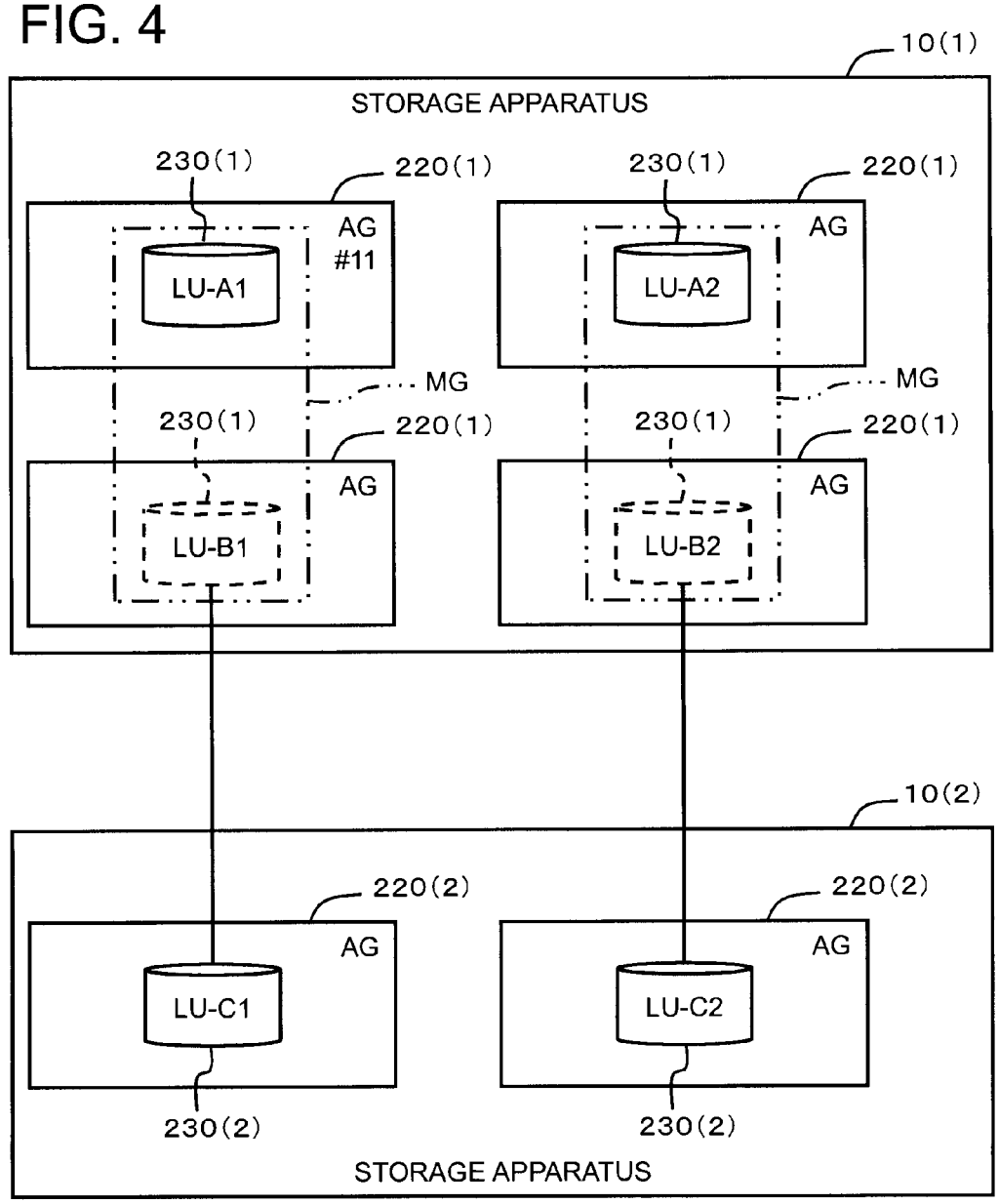
FIG. 4 is a schematic diagram showing the configuration of a migration group.

FIG. 4 shows a method for the one storage apparatus 10(1) to import a logical volume 230(2) of the other storage apparatus 10(2) and use this logical volume 230(2) inside the one storage apparatus 10(1). This technology is called an external connection in this specification. In FIG. 4, two storage apparatuses 10(1), 10(2) are shown for the sake of expediting the explanation, but the present invention is not limited to this, and external connection technology may also be used in three or more storage apparatuses.

Of the respective logical volumes 230(1) of the one storage apparatus 10(1), the logical volumes (LU-A1, LU-A2) appended with an "A" are logical volumes formed using the storage devices 210 inside the one storage apparatus 10(1). A logical volume that resides in a storage device 210 like this is called a real volume.

By contrast, the logical volumes (LU-B1, LU-B2) appended with a "B" are logical volumes corresponding to the real volumes (LU-C1, LU-C2) inside the other storage apparatus 10(2). A logical volume that does not reside in a storage device 210 like this is called an external connection volume or a virtual volume.

The host 50 recognizes and accesses the external connection volumes (LU-B1, LU-B2), but the logical volumes where the data is actually being stored are the real volumes (LU-C1, LU-C2) inside the other storage apparatus 10(2).

Accordingly, the one storage apparatus 10(1) converts a write command and a read command for the external connection volumes (LU-B1, LU-B2) to commands addressed to the real volumes (LU-C1, LU-C2) corresponding to the external connection volumes (LU-B1, LU-B2), and send the converted commands to the other storage apparatus 10(2).

Using this external connection technology, the one storage apparatus 10(1) is able to import the logical volume 230(2) that is inside the other storage apparatus 10(2) and use this logical volume 230(2) inside the one storage apparatus 10(1). Furthermore, it is possible to use the functions of the one storage apparatus 10(1) to provide the data inside the other storage apparatus 10(2) to the host 50, enabling the reliability and response performance of the system as a whole to be heightened.

In FIG. 4, the symbol "MG" denotes a migration group. A migration group is a group of a plurality of logical volumes 230 that is to undergo data migration together. As shown in FIG. 4, for example, the migration group may be formed from a real volume (LU-A1) and an external connection volume (LU-B1), or the migration group may be formed from real volumes.

Figure 5:
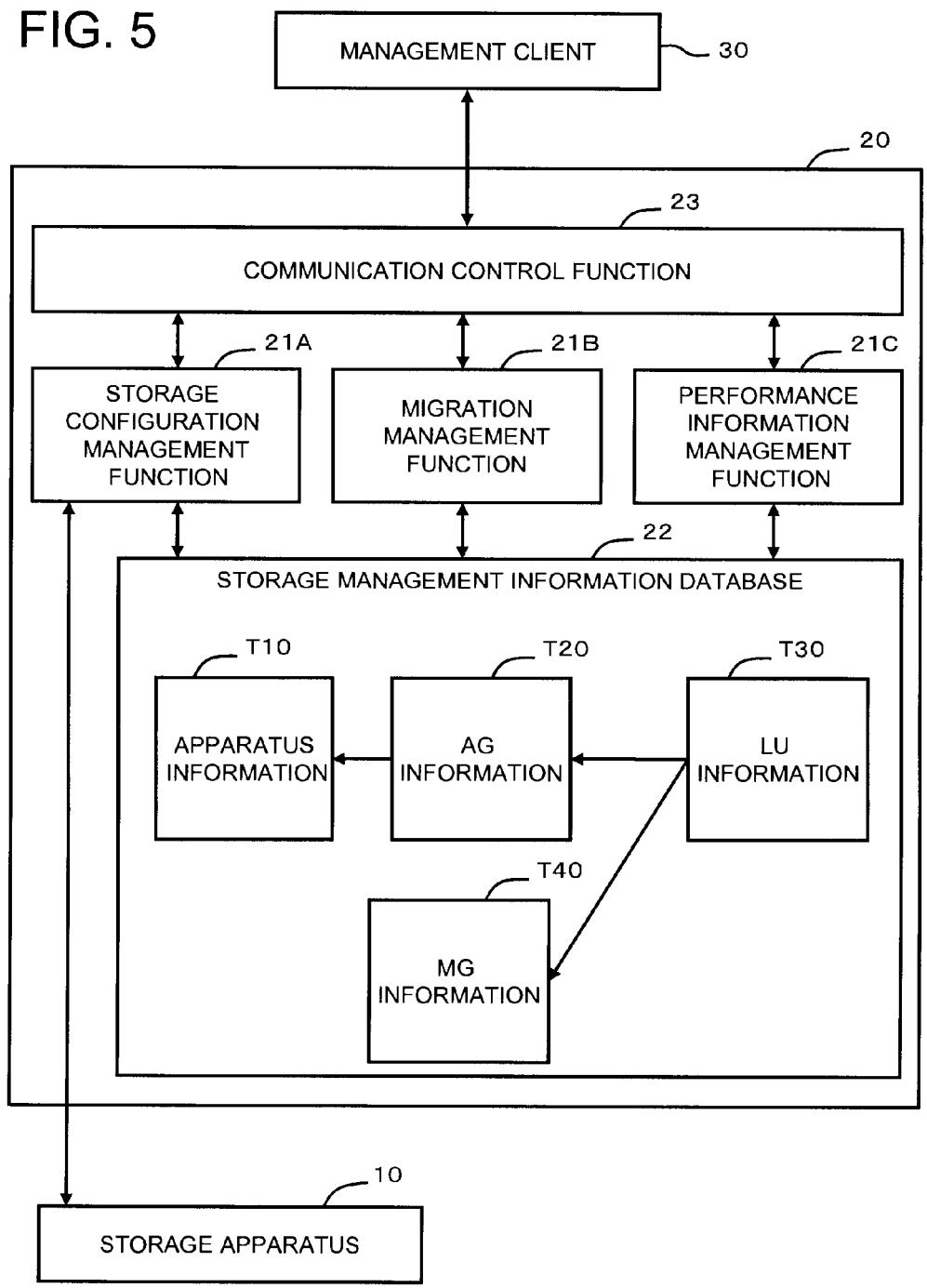
FIG. 5 is a schematic diagram showing the configuration of a management server.

FIG. 5 is a schematic diagram showing the configuration of the management server 20. The management server 20, for example, comprises the storage configuration management function 21A, the migration management function 21B, the performance information management function 21C, the storage management information database 22, and a communication control function 23. The management function 21 shown in FIG. 2 denotes all of the storage configuration management function 21A, the migration management function 21B, and the performance information management function 21C.

The storage configuration management function 21A collects information from the respective storage apparatuses 10 via the communication control function 23, and stores the collected information in the database 22. The storage configuration management function 21A, for example, collects the configurations of the respective array groups 220, the configurations of the respective logical volumes 230, access frequencies, and the sizes of write data and read data.

The migration management function 21B executes a data migration based on the plan set up by the user. Furthermore, the migration management function 21B retrieves a migration-destination array group 220 suited to the migration-source volume 230 specified by the user, and provides same to the management client 30.

The performance information management function 21C detects a variation in performance (including a variation in power consumption) during a predetermined period specified by the user on the basis of the information stored in the storage management information database 22, and provides this detected performance variation to the management client 30.

The operations by which the performance information management function 21C collects information related to the performance of the respective array groups 220 and the respective logical volumes 230 from the respective storage apparatuses 10 via the communication control function 23 and the storage configuration management function 21A, and stores this collected information in the database 22 will be explained here. However, the present invention is not limited to the configuration example described hereinabove, and the configuration may also be such that the storage configuration management function 21A collects the performance information from the respective storage apparatuses 10 and stores same in the database 22.

The configuration of the storage management information database 22 will be explained based on FIGS. 6 through 9. The storage management information database 22, as described hereinbelow, comprises a plurality of information databases T10 through T40.

FIG. 6 shows an apparatus information database T10. The apparatus information database T10 is for managing information on the storage apparatuses 10. The apparatus information database T10, for example, comprises an apparatus ID column C11, a serial number column C12, a model name column C13, and a power consumption column C14.

The apparatus ID is information for identifying the respective storage apparatuses 10 inside the storage system. The serial number is the manufacturing number assigned to each storage apparatus 10. The model name is the name denoting the model of each storage apparatus 10. Power consumption shows the value of the average power consumption of the respective storage apparatuses 10. If the model name is known, a separate table can be used to learn the type(s) of storage devices 210, the size of the cache memory 140, and the number of communication ports mounted in this storage apparatus 10.

FIG. 7 shows an array group information database T20. The array group information database T20 is for managing the information of the respective array groups 220. The array group information database T20, for example, comprises an array group ID column C21, an affiliated apparatus ID column C22, a size column C23, a RAID configuration column C24, a maximum performance value column C25, a power consumption column C26, an I/O characteristics column C27, and a performance column C28.

The array group (AG in the drawing) ID is information for identifying the respective array groups 220. The affiliated apparatus ID is the apparatus ID of the storage apparatus 10 to which the array group 220 belongs. The size denotes the total storage capacity of the array group 220. The RAID configuration, for example, denotes the RAID configuration of the array group 220, such as 4D+1P (RAID5) or 6D+2P (RAID6). The maximum performance value denotes the maximum performance value that the array group 220 is capable of exhibiting. The power consumption denotes the value of the power consumed by the array group 220. The I/O characteristics distinguish the access characteristics of the array group 220 between those of random access and sequential access. The performance denotes the sum total of the load of the respective logical volumes 230 that belong to the array group 220.

FIG. 8 shows a volume information database T30. The volume information database T30 manages logical volume 230 information. The volume information database T30, for example, comprises a logical volume ID column C31; an affiliated array group ID column C32; an affiliated migration group ID column C33; a power consumption column C34; an I/O characteristics column C35; and a performance column C36.

The logical volume ID is information for identifying the respective logical volumes 230. The affiliated array group ID is information for specifying an array group to which the logical volume belongs. The affiliated migration group ID is information for specifying the migration group to which the logical volume belongs. The power consumption is the power consumed by the logical volume. The I/O characteristics distinguish been random access and sequential access. The performance denotes the load of the logical volume.

The method for computing the power consumption will be described. One method is to provide a sensor (an electric current sensor or the like) for detecting the power consumption inside the storage apparatuses 10, making it possible to estimate the power consumption of each array group 220 and the power consumption of each logical volume 230 based on the power consumption of the entire apparatus and the number of storage devices 210 in operation. A different method, for example, makes it possible to estimate the power consumption of the array group 220 and the logical volume 230 based on such parameters as the rated power consumption and operating time of the storage devices 210, and the average value of the power consumed by the respective control circuits of the storage apparatuses 10.

FIG. 9 shows a migration group information database T40. The migration group information database T40 manages migration group information, and, for example, comprises a migration group ID column C41; a power consumption column C42; a performance column C43, and an I/O characteristics column C44.

The migration group ID is information for identifying the respective migration groups. The power consumption is the total value of the power consumed by the respective logical volumes 230 included in the migration group. The performance is the total performance value of the respective logical volumes 230 included in the migration group. The I/O characteristics distinguish between random access and sequential access, i.e. the access characteristics of the logical volumes 230 included in the migration group.

Figure 10:
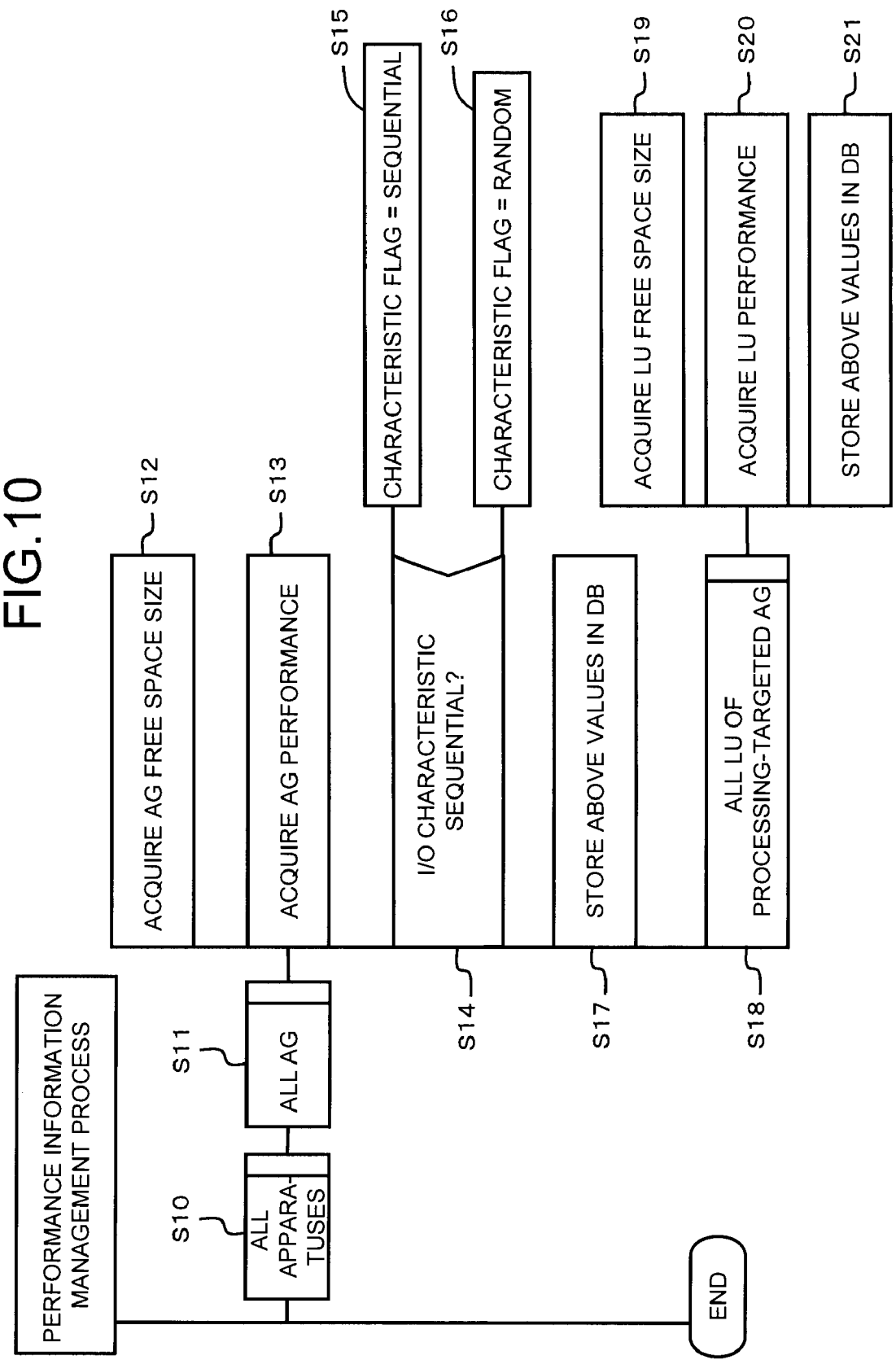
FIG. 10 is a PAD diagram showing the process for acquiring performance information.

FIG. 10 is a PAD diagram showing the process for acquiring and storing performance information in the storage management information database 22. This processing, for example, is executed in accordance with the performance information management function 21C for each predetermined time. Furthermore, even in a case where the configuration within the storage system has been changed, the processing shown in FIG. 10 may still be executed. That is, it is possible to collect the performance information from the respective storage apparatuses 10 and store this collected information in the database 22 either regularly or irregularly. The operation of the management server 20 will be explained below.

The management server 20 executes the following steps for all the array groups 220 of all the storage apparatuses 10 that are subject to this management (S10, S11). That is, the following steps are executed in order for all of the array groups 220 inside the storage system.

First, the management server 20 acquires the free space size of the array group 220 targeted for processing (S12). The free space size is the size of the unused storage area of the total storage area of the array group 220.

The management server 20 acquires the performance (the current load) of the processing-targeted array group (S13). The performance, for example, may be computed by multiplying the size of either write data or read data by the number of times that I/O requests have been issued (performance=number of I/O issued×(write data or read data size)).

The management server 20 acquires the access characteristics (I/O characteristics in the drawing) of each array group 220, and determines if random accesses or sequential accesses are more numerous (S14). In a case where sequential accesses are more numerous, the management server 20 sets sequential as the characteristic flag (S15), and in a case where random accesses are more numerous, sets random as the characteristic flag (S16). The characteristic flag is information for distinguishing between access characteristics.

Consequently, the management server 20 is able to acquire the information required for the processing-targeted array group 220. The management server 20 stores the respective values obtained in S12, S13, S15 and S16 in the array group information database T20 (S17).

Furthermore, the management server 20 executes steps S19 through S21 for all the logical volumes 230 inside the processing-targeted array group 220 (S18). First, the management server 20 acquires the fee space size of the processing-targeted logical volume 230 (S19), and next acquires the performance of the processing-targeted logical volume 230 (S20). The management server 20 stores the respective values obtained in S19 and S20 in the logical volume information database T30 (S21).

FIG. 11 is a PAD diagram showing the process for providing the user with the state of a performance variation during a predetermined period in either a migration source or a migration destination based on accumulated performance information. This process is implemented by the performance information management function 21C, but in the following explanation, the management server 20 is attributed with carrying out this operation.

Figure 12A:
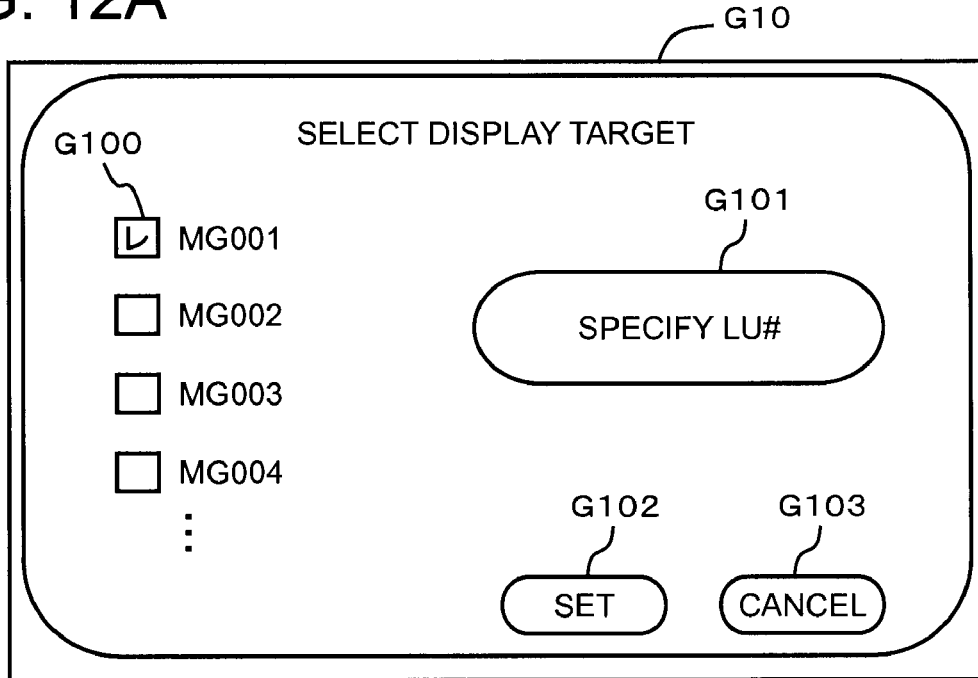
FIG. 12 is an example of a migration source selection screen for displaying performance information.

The management server 20 selects either one of a display-targeted migration group or logical volume 230 as shown in FIG. 12A (S30). FIG. 12A shows the screen G10 for selecting a display target. This display target selection screen G10, for example, comprises a migration group selection portion G100; a logical volume specification portion G101; a set button G102; and a cancel button G103. When the user wants a display in migration group units, the user selects the desired migration group ID in accordance with the migration selection portion G100. When the user wants to directly specify a logical volume 230, the user specifies the desired logical volume ID via the logical volume specification portion G101.

Figure 12B:
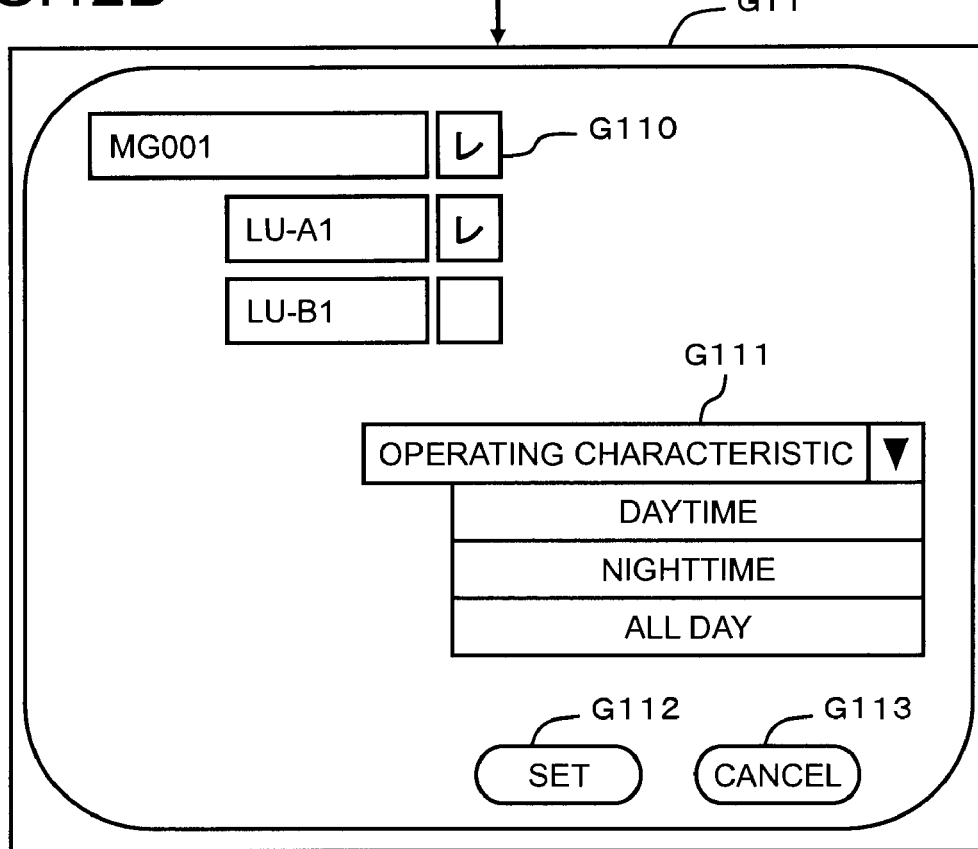

When either selection or specification is complete and the user presses the set button G102, processing moves to an operating characteristic selection screen G11 shown in FIG. 12B. The operating characteristic selection screen G11 is for selecting an operating characteristic, and, for example, comprises a target selection portion G110; an operating characteristic selection portion G111; a set button G112; and a cancel button G113.

In a case where a migration group has been selected on the screen G10, the selected migration group ID and the IDs of the respective logical volumes 230 included in this migration group are displayed in the target selection portion G110 of the screen G11. For example, the user is able to select either the migration group only, or the migration groups and one or a plurality of the logical volumes included therein.

Operating characteristic signifies the characteristic of the method of using either the migration group or the logical volume 230, i.e. the characteristic feature of a variation in the utilization status. The operating characteristic, for example, may include "daytime", "nighttime" and "all day". "Daytime", for example, is selected when checking the access characteristics during business hours, such as from 9:00 AM to 6:00 PM. "Nighttime", for example, is selected when checking the access characteristics subsequent to the end of business hours, such as from 8:00 PM until 6:00 AM. "All Day", for example, is selected when checking access characteristics for either an entire day, such as from 12:00 AM to 12:00 PM, or for practically an entire day. As shown in FIG. 11, the user selects via the screen G11 a display-targeted migration group and/or logical volume, and an operating characteristic (S31).

The management server 20, in daily units (S32), executes the following two steps either for all the logical volumes selected by the user or for all the logical volumes configuring the migration group selected by the user (S33).

Firstly, the management server 20 acquires the performance information of the operating characteristic selected by the user from the volume information database T30 (S34). Secondly, the management server 20 adds the performance information acquired in S34 to the total value of the performance information for the migration group as a whole (S35). That is, the management server 20 acquires the performance information within a scope corresponding to the operating characteristic for each logical volume configuring the migration group (S34), and computes the performance information for the migration group as a whole by totaling the respective values of the acquired performance information (S35).

The management server 20 computes the average performance information for the migration group by dividing the total value of the performance information computed in S35 by the number of logical volumes inside the migration group (S36). Lastly, the management server 20 graphically outputs the computed performance information (S37).

The display process shown in FIG. 11 is not limited to a case for displaying a variation in the utilization status of a migration source, but rather may also be used when displaying a variation in the utilization status of a migration destination. Furthermore, using the display process shown in FIG. 11 also makes it possible to comparatively output a variation in the migration-source utilization status and a variation in the migration-destination utilization status.

Examples of screens provided to the management client 30 will be explained based on FIGS. 13 through 16. The respective screens described below are only examples, and the present invention is not limited to the screen examples shown in the drawings. A portion of the elements displayed in the screens may be discarded or changed to different elements, and new elements not shown in the screens may be added.

Figure 13:
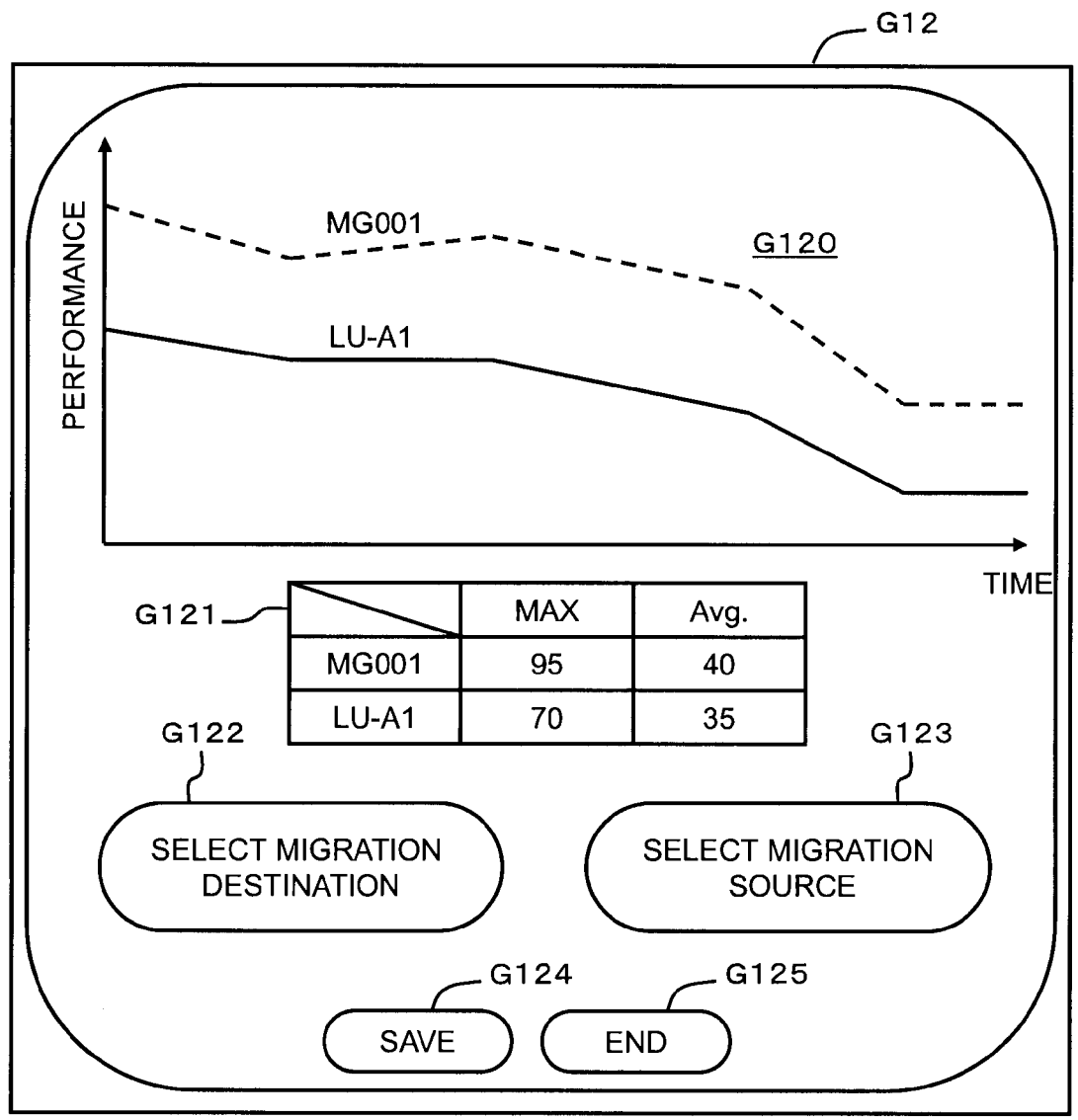
FIG. 13 is an example of a screen for graphically displaying the performance information of the migration source.

FIG. 13 is a screen G12 for comparatively displaying a variation in the utilization status of a migration-source logical volume 230 and a variation in the utilization status of the migration group that includes the migration-source logical volume 230. That is, the screen G12 is an example of a display output of "migration-source status variations showing variations in the utilization status during the predetermined period."

The migration-source status variations output screen G12, for example, comprises a graph display portion G120; a table display portion G121; a button G122 for selecting a migration destination; a button G123 for selecting a migration source; a save button G124; and an end button G125.

The graph display portion G120 graphically displays variations in performance information over time for the migration group and/or logical volume 230 selected as the display target. The vertical axis shows the value of the performance information, and the horizontal axis shows the time.

The table display portion G121 numerically displays the performance information time changes. The table display portion G121, for example, displays a performance information maximum value and average value for the migration group and/or the logical volume 230. Consequently, the user is able to accurately discern values that are difficult to read from the graph. Furthermore, the present invention is not limited to a maximum value and an average value, and, for example, a minimum value and other such values may also be displayed.

The button G122 for selecting a migration destination is operated when the user selects a migration-destination array group 220. When the user operates this button G122, processing shifts to the screen G13 shown in FIG. 14, which will be explained further below. The button G123 for selecting a migration source is operated when re-selecting the migration group and/or logical volume 230 of the migration source. When the user operates the button G123, processing returns to the screen G10 shown in FIG. 12.

The save button G124 is for temporarily saving status variations of the displayed migration group and/or logical volume 230. By saving migration-source status variations, the user is able to compare on the same screen migration-source status variations and status variations of a migration-destination array group 220, which will be explained further below.

Figure 14A:
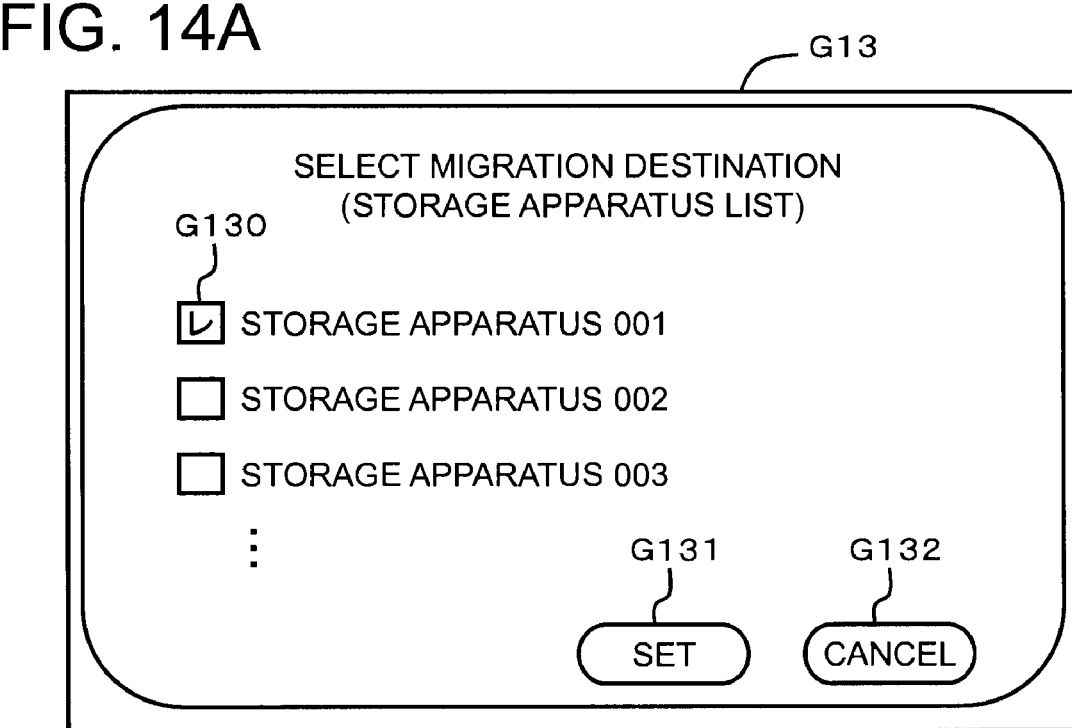
FIG. 14 is an example of a migration destination selection screen for displaying performance information.
Figure 14B:
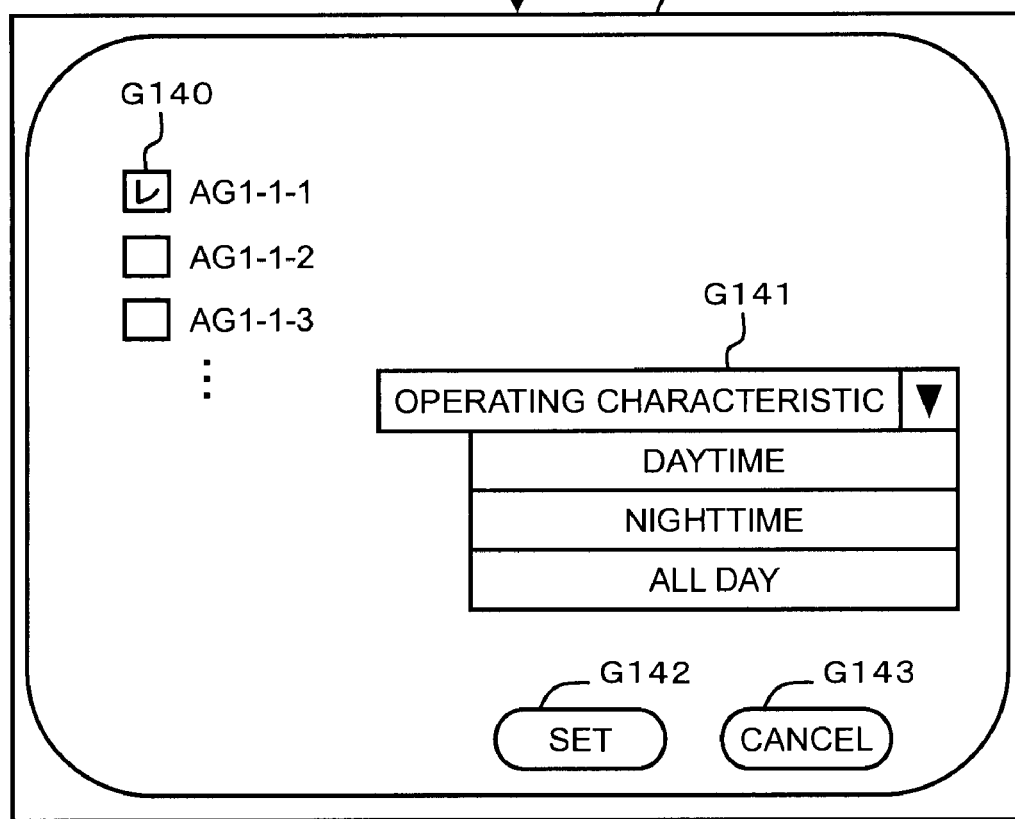

FIG. 14 shows screens G13 and G14 for selecting a migration-destination array group 220. The first selection screen G13 is a migration-destination apparatus selection screen for selecting the storage apparatus 10 to be the migration destination. This screen G13, for example, comprises an apparatus list display portion G130 for displaying a list of storage apparatuses 10; a set button G131; and a cancel button G132.

The user selects from among the respective storage apparatuses 10 in the storage system a storage apparatus 10 to be the migration-destination candidate for a migration-source logical volume (may also be called the migration-targeted volume), and operates the set button G131. When the user operates the set button G131, processing shifts to the screen G14 shown in FIG. 14B.

The screen G14 is for selecting an array group 220 to be the migration destination. The migration-destination selection screen G14, for example, comprises an array group list display portion G140 for displaying a list of array groups; an operating characteristic selection portion G141 for selecting an operating characteristic; a set button G142; and a cancel button G143.

The IDs of the respective array groups 220 of the storage apparatus 10 selected via G13 are listed up and displayed in the array group list display portion G140. The user selects from among the displayed list of array groups 220 an array group 220 for consideration as the migration destination.

Furthermore, by operating the operating characteristic selection portion G141, the user selects the operating characteristic that will be displayed for the array group 220 selected as the migration destination.

Figure 15:
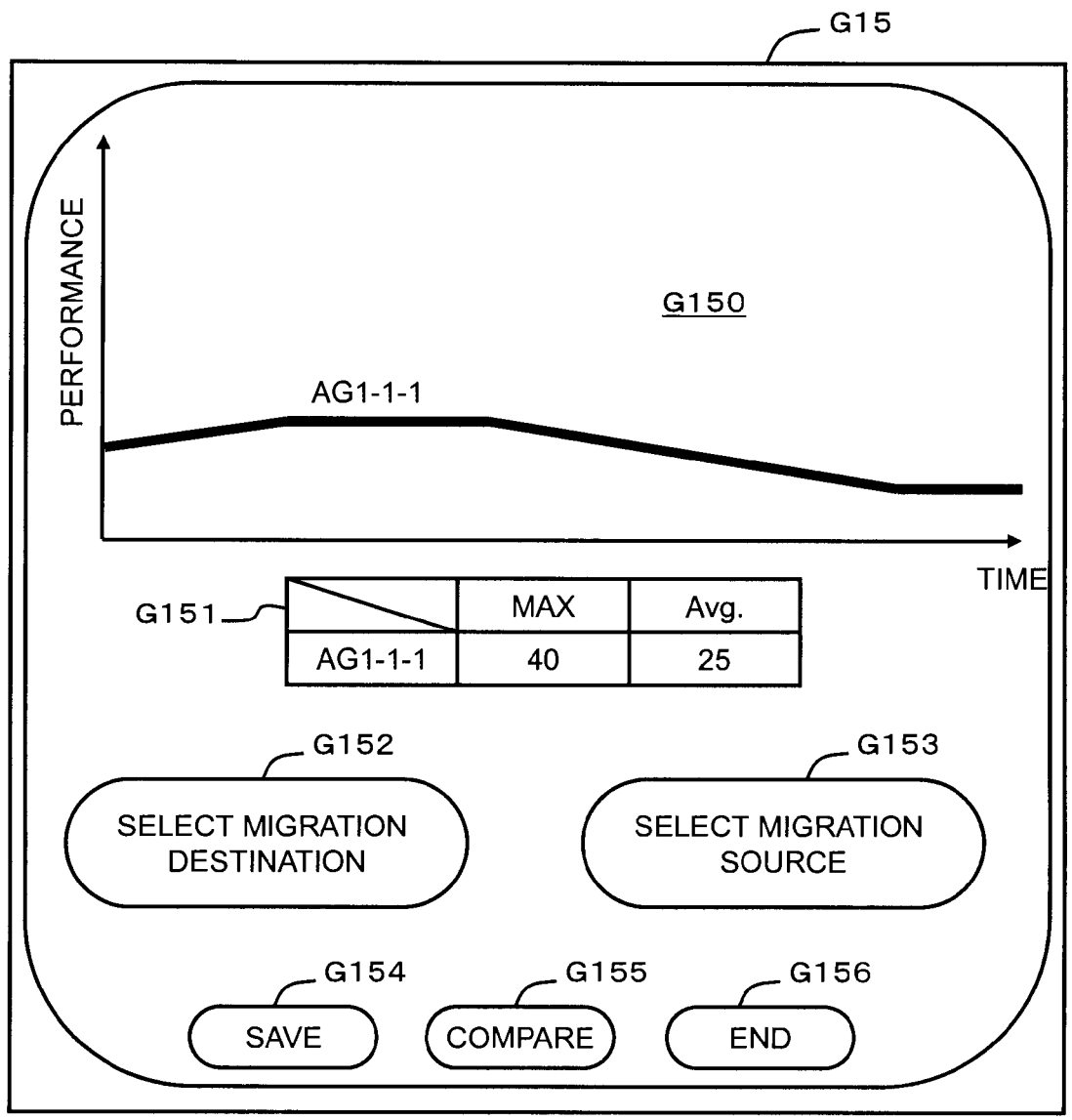
FIG. 15 is an example of a screen for graphically displaying the performance information of the migration destination.

FIG. 15 shows the screen G15 for displaying variations in the utilization status during a predetermined period for the array group 220 selected as the migration destination. The screen G15 displays migration-destination status variations using a graph and table.

The screen G15, for example, comprises a graph display portion G150; a table display portion G151; a button G152 for selecting a migration destination; a button G153 for selecting a migration source; a save button G154; a compare button G155; and an end button G156.

The graph display portion G150 graphically displays variations in the utilization status over time for the array group 220 selected as the migration destination. The table display portion G151, for example, displays in numerical form a maximum value and an average value of the performance information of the array group 220 selected as the migration destination.

To change the migration-destination array group 220, the user operates the button G152 and returns to the screen G13. To change the migration-source logical volume, the user operates the button G153 and returns to the screen G10. To temporarily save the displayed array group, the user operates the save button G154.

Figure 16:
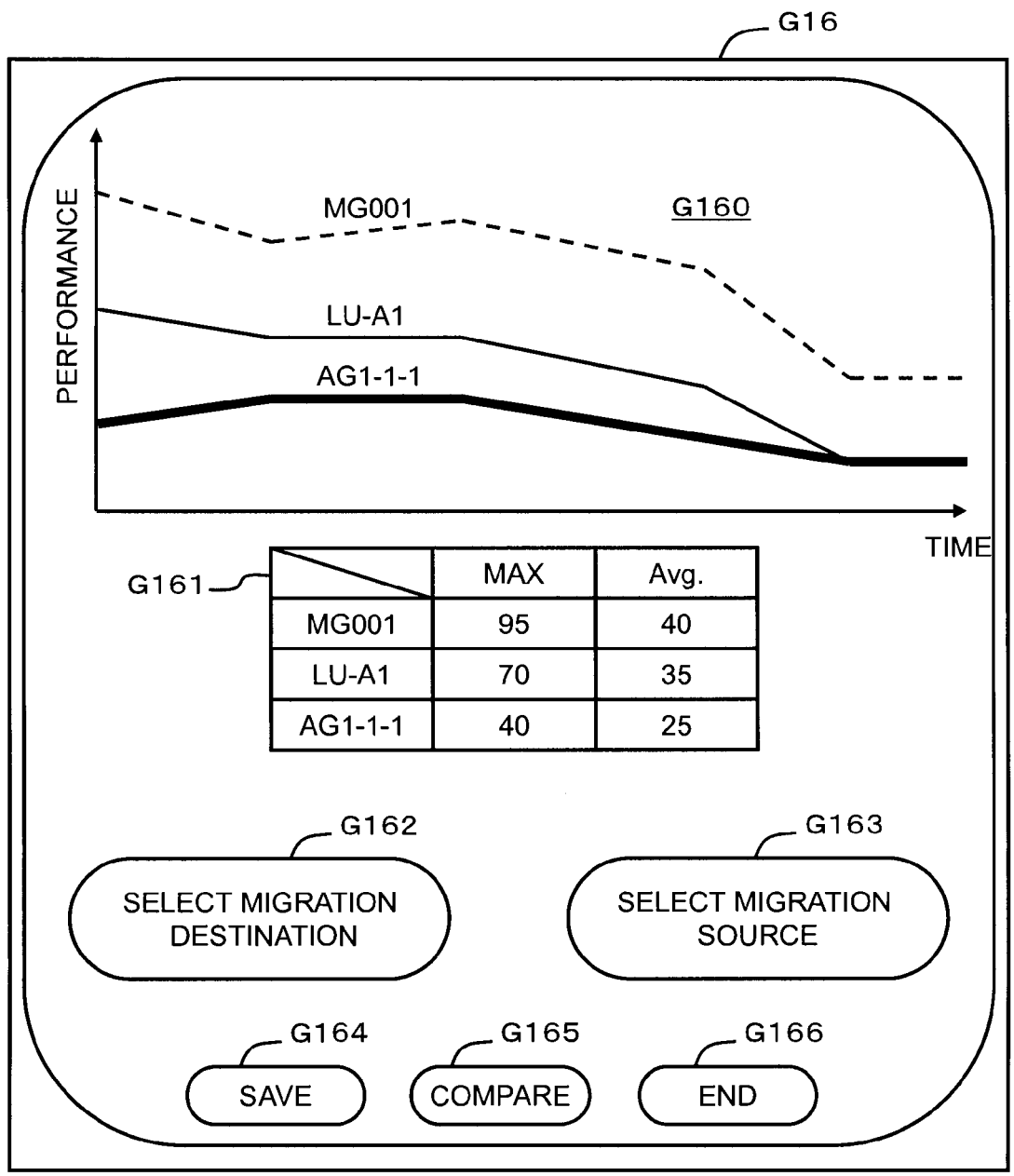
FIG. 16 is an example of a screen for graphically displaying and comparing the respective performance information of a migration source and a migration destination.

FIG. 16 is an example of a screen that makes it possible to simultaneously compare on the same screen migration-source status variations and migration-destination status variations. When the user operates the compare button G155 on the screen G15 shown in FIG. 15, a comparison screen G16 is displayed.

The comparison screen G16, for example, comprises a graph display portion G160; a table display portion G161; a button G162 for selecting a migration destination; a button G163 for selecting a migration source; a save button G164; a compare button G165, and an end button G166.

The graph display portion G160 respectively graphs and displays variations in the utilization status related to the specified operating characteristics of the migration source and the migration destination. In FIG. 16, the variations in the utilization status of the migration group (MG001) are displayed as a dotted-line polyline graph. In FIG. 16, the variations in the utilization status of the migration-source logical volume (LU-A1) belonging to the migration group (MG001) are displayed as a solid-line polyline graph. In FIG. 16, the variations in the utilization status of the array group (AG1-1-1) selected as the migration destination are displayed as a thick solid-line polyline graph.

The table display portion G161 numerically displays the maximum values and average values of the performance information for the migration group (MG001), the migration-source logical volume (LU-A1) and the array group (AG1-1-1).

On the basis of the contents displayed in the screen G16, the user determines whether or not the selected array group 220 is suitable as the migration destination. One factor that the user may consider is whether or not the operating characteristic of the migration source conforms to the operating characteristic of the migration destination.

For example, it is preferable from the standpoint of power consumption that a migration-source logical volume 230 that is used mostly during daytime hours be migrated inside an array group 220 having another logical volume that is similarly used mostly during daytime hours. This makes it possible to lengthen the time during which power to the respective storage devices 210 configuring this array group 220 is shut off at night.

Another factor that the user may consider is the possibility of the migration-destination array group 220 becoming overloaded. That is, if the maximum value of the performance information of the migration-destination array group 220 reaches a predetermined upper limit value when a migration is executed, it is preferable that this migration be cancelled and a different array group 220 be selected as the migration destination. This is because response performance will decline if the array group 220 is accessed excessively.

Configuring this embodiment as described hereinabove achieves the following effects.

In this embodiment, it is possible to regularly collect and store the performance information of the respective logical volumes 230 and array groups 220, and to visually provide the user with temporal variations in the utilization status at data migration setup. Therefore, the user is able to take in account migration-source status variations and migration-destination status variations to devise a more suitable data migration plan, enhancing usability.

In this embodiment, it is possible to simultaneously graph and display on the same screen migration-source status variations and migration-destination status variations. Therefore, the user is able to use the graphs to easily predict variations during the implementation of a data migration.

[Second Embodiment]

A second embodiment will be explained based on FIGS. 17 and 18. The respective embodiments below, to include this embodiment, correspond to modifications of the first embodiment. Therefore, in the respective embodiments hereinbelow, explanations will focus mainly on the points of difference with the first embodiment. In the second embodiment, a suitable array group 220 is automatically retrieved and recommended to the user as the migration destination.

Figure 17A:
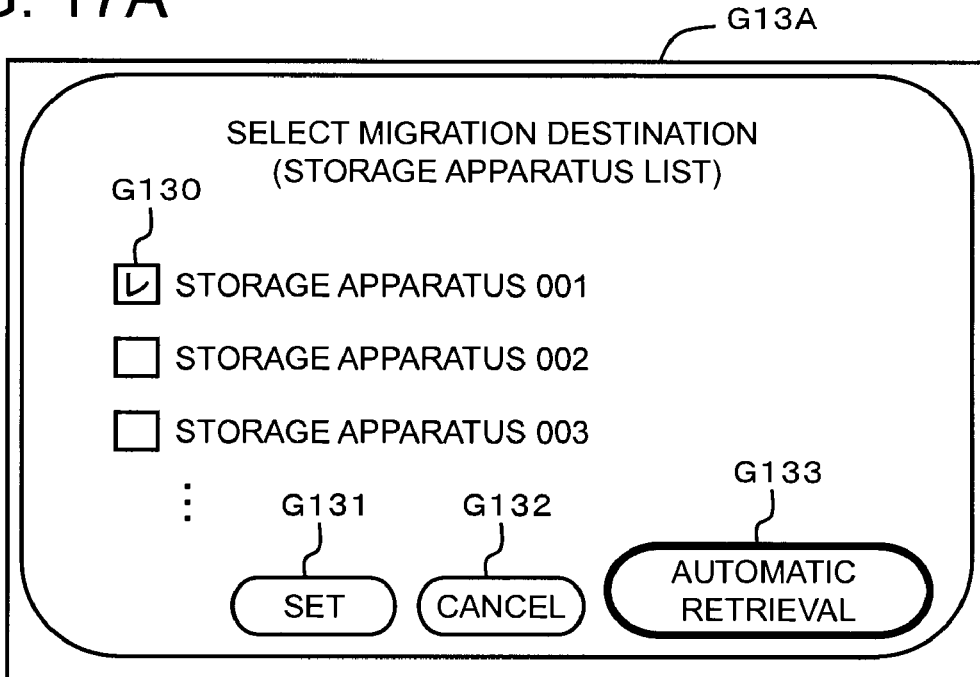
FIG. 17 is an example of a migration destination automatic retrieval screen provided by a data migration management apparatus related to a second embodiment.

FIG. 17 shows the screen G13 for selecting an array group 220 to be the migration destination. The screen 13A shown in FIG. 17A comprises the same display elements G130 through G132 as those in the screen G13 shown in FIG. 14.

Furthermore, in the screen G13A, an automatic retrieval button G133 for automatically retrieving a suitable migration-destination array group 220 is provided. When the user operates the automatic retrieval button G133, the processing shown in FIG. 18 is executed. The screen G14A of FIG. 17B will be described further below.

FIG. 18 is a PAD diagram showing the process for automatically retrieving a migration-destination array group 220. The management server 20 acquires the characteristic flag of the migration-source logical volume 230 from the volume information database T30 (S40). As described hereinabove, the characteristic flag is information indicating the access status of this logical volume 230 (I/O frequency and I/O size), and either one of "random access" or "sequential access" is set in this embodiment.

The management server 20 sorts all the array groups 220 (S42) of the respective storage apparatuses 10 for all the storage apparatuses 10 (S41) inside the storage system in ascending order by performance information (S43). That is, the management server 20 sorts all the array groups 220 in the storage system in order beginning with those having the smallest load.

The management server 20 determines whether or not the characteristic flag of the migration-source logical volume 230 matches the characteristic flags of the respective array groups 220 in the order (S44) in which these array groups 220 were sorted in S43 (S45).

Furthermore, in a case where not even one logic volume 230 is set in an array group 220 (in the case of an unused array group) or in the case where the logical volume 230 disposed in an array group 220 is hardly ever accessed, the characteristic flag of this array group 220 is determined to match the characteristic flag of migration-source logical volume 230. Consequently, it is possible to extract an array group 220 with a low utilization frequency as a migration-destination candidate.

Then, the management server 20 selects as a migration-destination candidate an array group 220 having a characteristic flag that matches the characteristic flag of the migration-source logical volume 230 (S46).

Figure 17B:
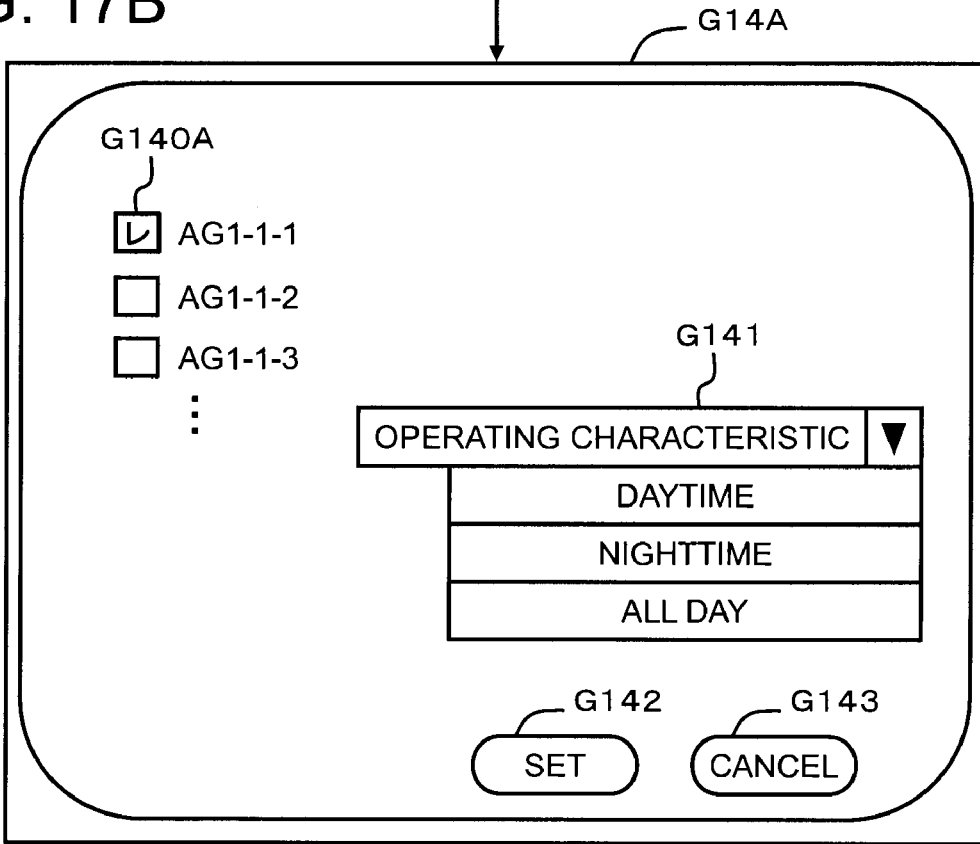

Refer to FIG. 17B. The screen G14A is for selecting a migration-destination candidate. This screen G14A comprises the same display elements G141 through G143 as those of the screen G14 shown in FIG. 14.

The screen G14A comprises a candidate list display portion G140A. The candidate list display portion G140A lists up and displays the IDs of the respective migration-destination candidate array groups 220 retrieved in accordance with the process shown in FIG. 18. By selecting the ID and operating characteristic of a migration-destination candidate array group 220, the user is able to graphically display and confirm variations in the utilization status during a predetermined period of an array group 220 retrieved as a migration-destination candidate.

Configuring this embodiment like this also achieves the same effects as those of the first embodiment. In addition, in this embodiment, it is possible to automatically select a suitable array group 220 as the migration destination. Therefore, it is possible to further heighten user usability.

[Third Embodiment]

A third embodiment will be explained based on FIGS. 19 through 25. This embodiment focuses on the relationship between a data migration and power consumption, and provides the user with variations in power consumption before and after data migration execution.

FIG. 19 is a PAD diagram showing the process for the management server 20 to collect and store information related to power consumption from inside the storage system. The management server 20 executes the following steps S52 through S54 for all the array groups 220 (S51) of all the storage apparatuses 10 (S50) inside the storage system.

The management server 20 acquires the power consumption value of an array group 220 (S52). The method for acquiring the power consumption value is as described hereinabove. For example, the power consumption of an array group 220 may be estimated based on a plurality of parameters. The management server 20 stores the power consumption value acquired in S52 in the array group information database T20 (S53).

The management server 20 acquires the power consumption values of the respective logical volumes 230 for all the logical volumes 230 (S54) included in this array group 220 (S55), and stores the acquired power consumption values in the volume information database T30 (S56).

Figure 20:
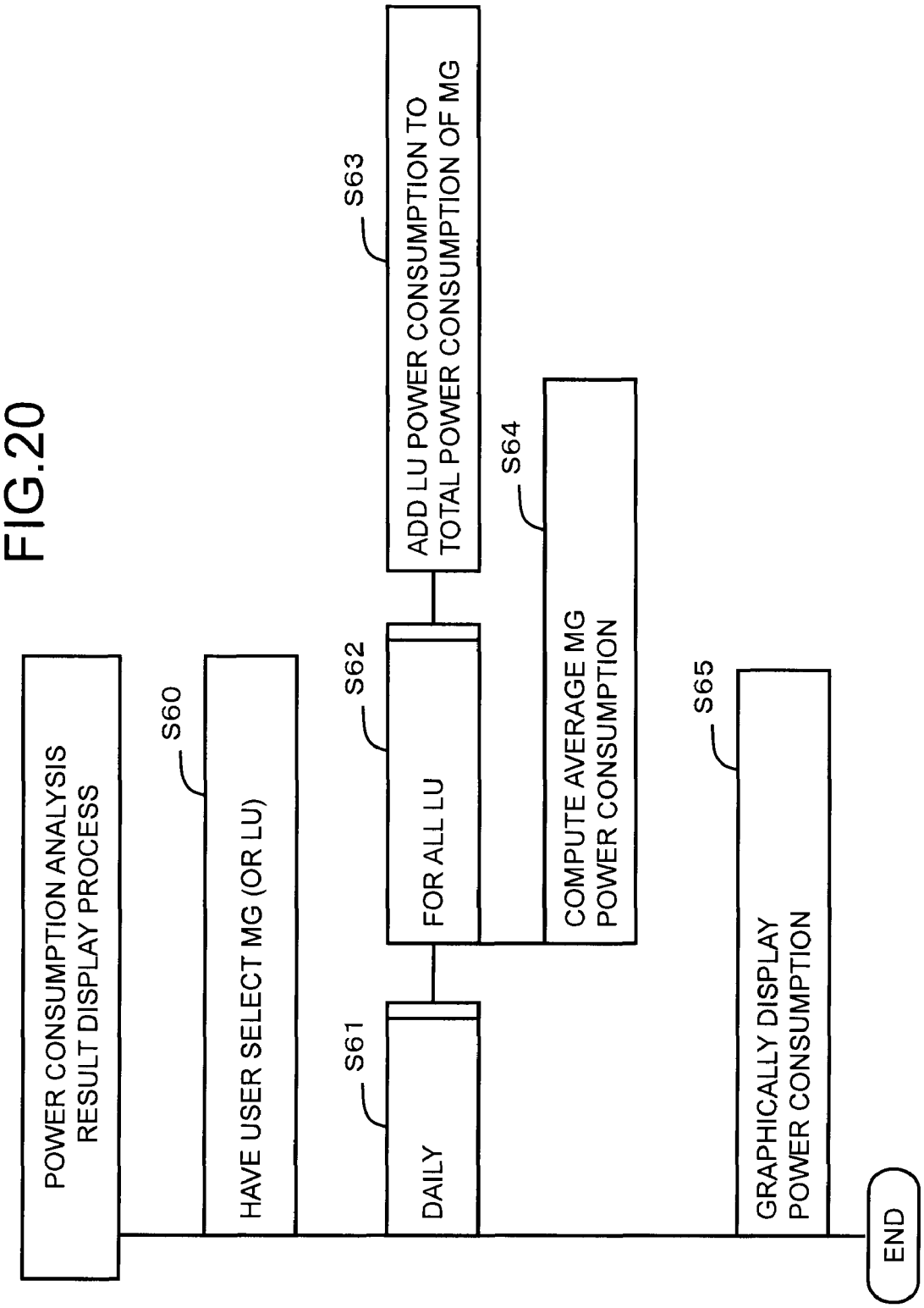
FIG. 20 is a PAD diagram showing the process for displaying the results of power consumption analysis.

FIG. 20 is a PAD diagram showing the process for displaying power consumption analysis results. Screen transitions will be described further below by referring to other drawings. The user uses the screen G11B, which is provided from the management server 20, to select either the display-targeted migration group or logical volume 230 (S60).

The management server 20 computes the power consumption value for the entire migration group by adding the respective power consumption values in daily units (S61) for all the logical volumes selected by the user (S62) (or all the logical volumes inside the migration group selected by the user) (S63).

Then, the management server 20 computes the average power consumption value for the migration group by dividing the total power consumption value computed in S63 by the number of logical volumes included in this migration group (S64). The management server 20 graphically displays variations in power consumption over time (S65).

Figure 21A:
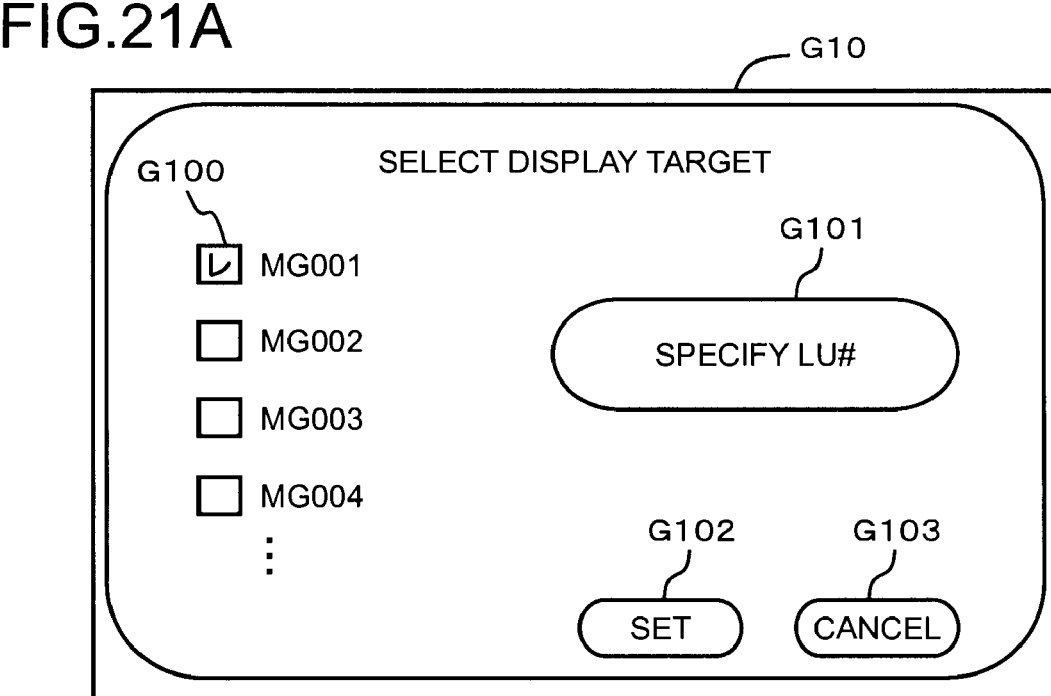
FIG. 21 is an example of a migration source selection screen for analyzing power consumption.
Figure 21B:
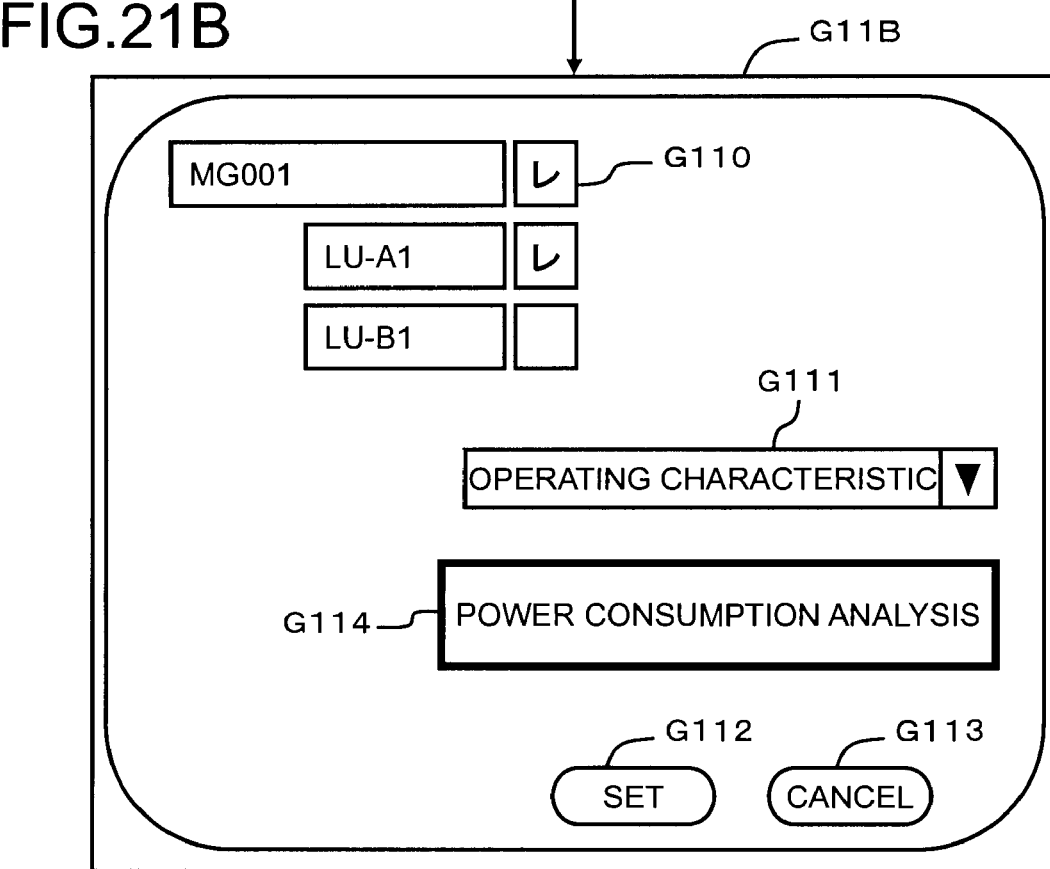

FIG. 21 shows an example of a screen for selecting a display target. Compared to the screen G11 shown in FIG. 12B, the selection screen G11B shown in FIG. 21B comprises a button G114 for analyzing power consumption. When the user operates the button G114, the display processing shown in FIG. 20 is executed, and the screen shown in FIG. 22 is displayed.

Figure 22:
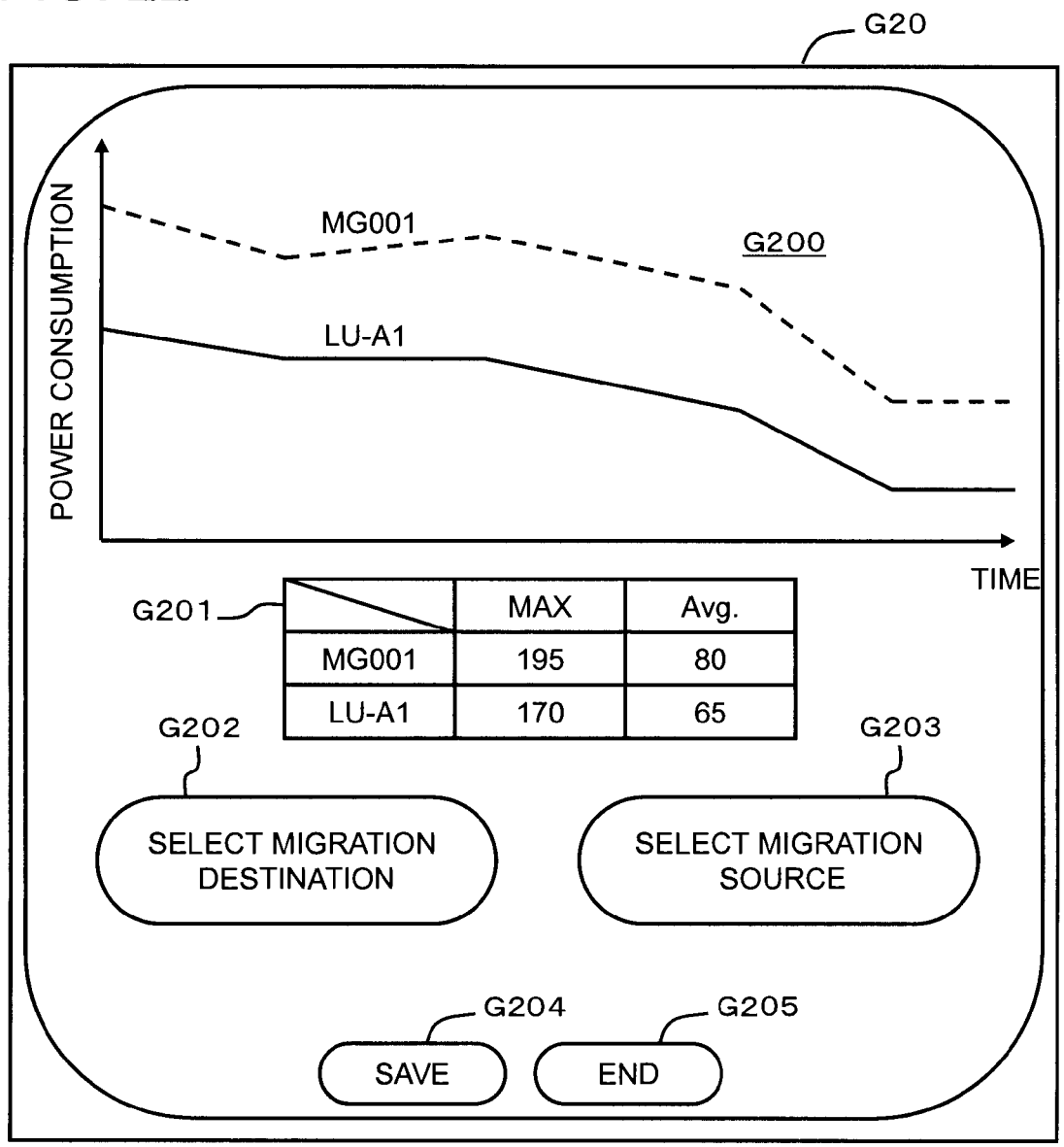
FIG. 22 is an example of a screen for graphically displaying variations in power consumption.

FIG. 22 shows a screen G20 showing variations in power consumption over time for the migration-source logical volume and/or migration group. The migration-source power consumption display screen G20, for example, comprises a graph display portion G200; a table display portion G201; a button G202 for selecting the migration destination; a button G203 for selecting the migration source; a save button G204; and an end button G205.

The graph display portion G200 graphically displays variations in power consumption values over time for the display-targeted logical volume and/or migration group. The table display portion G201, for example, numerically displays the maximum value and average value of power consumption for the logical volume and/or migration group.

When the user operates the button G202 for selecting the migration destination, processing shifts to the migration destination selection screen shown in FIG. 23, which will be explained further below. When the user operates the button G203 for selecting the migration source, the processing returns to the screen G10 shown in FIG. 21. The save button G204 is for temporarily saving the migration-source power consumption value.

Figure 23A:
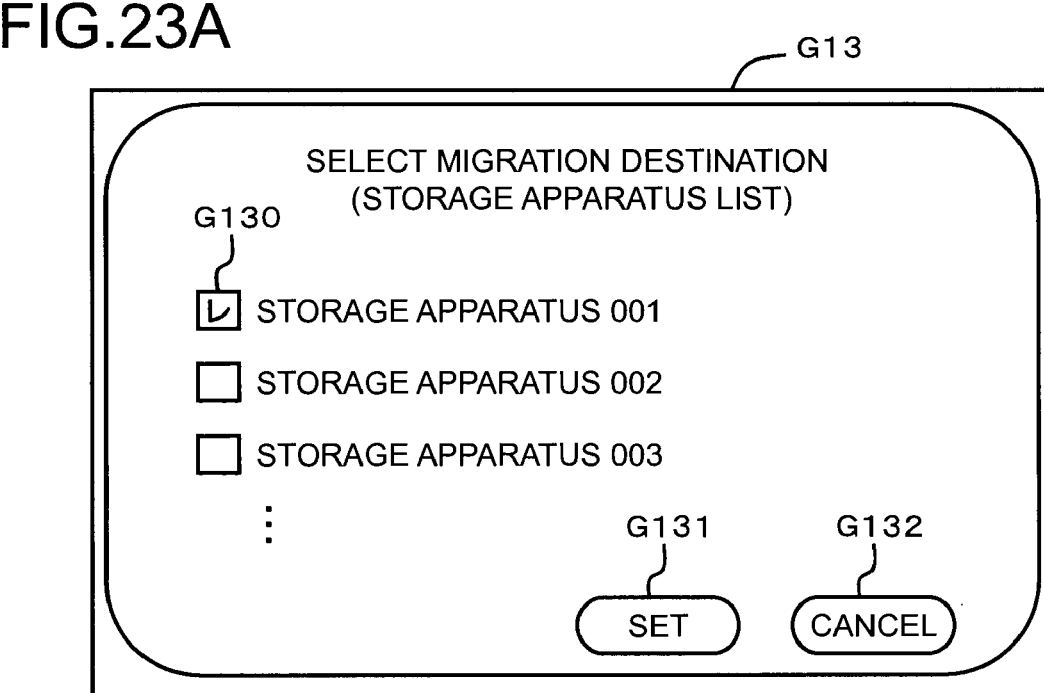
FIG. 23 is an example of a migration destination selection screen for analyzing power consumption.
Figure 23B:
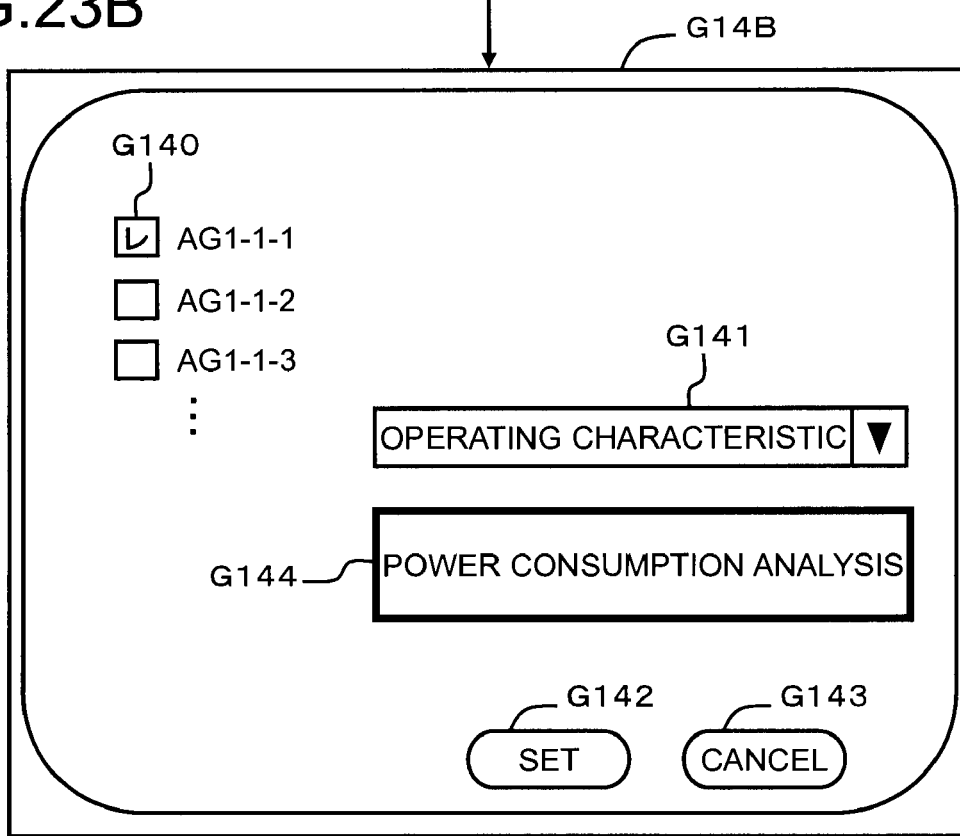

FIG. 23 shows a screen for selecting the migration destination. As shown in FIG. 23B, in addition to the respective elements G140 through G143 of the screen G14 shown in FIG. 14B, the screen G14B is also provided with a button G144 for analyzing power consumption. When the user operates the button G144, the power consumption display processing described using FIG. 20 is executed, and the screen G21 shown in FIG. 24 is created.

Figure 24:
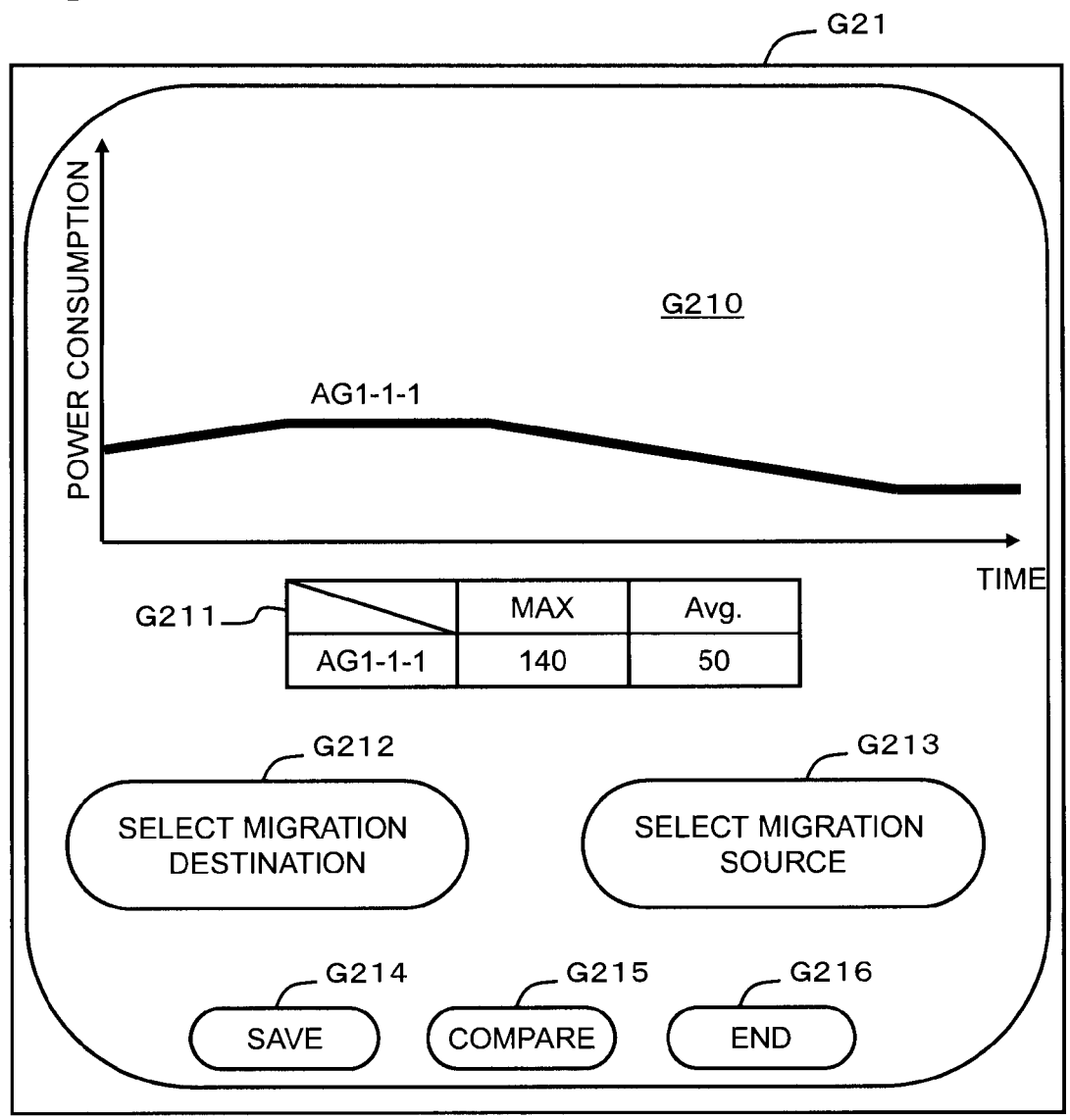
FIG. 24 is an example of a screen for graphically displaying variations in power consumption.

FIG. 24 shows the screen G21 that shows variations in migration-destination power consumption over time. This screen G21, for example, comprises a graph display portion G210; a table display portion G211; a button G212 for selecting the migration destination; a button G213 for selecting the migration source; a save button G214; a compare button G215; and an end button G216.

The graph display portion G210 graphically displays temporal variations in the power consumption of the array group 220 selected as the migration destination. The table display portion G211, for example, numerically displays the power consumption maximum value and average value.

When the user operates the button G212 for selecting the migration destination, processing returns to the screen G13 shown in FIG. 23. When the user operates the button G213 for selecting the migration source, processing returns to the screen G10 shown in FIG. 21. The save button G214 is operated to temporarily store variations in the power consumption of the migration destination over time. The compare button G125 is operated when simultaneously displaying and comparing on the same screen the temporal variations in migration-source power consumption and the temporal variations in migration-destination power consumption.

Figure 25:
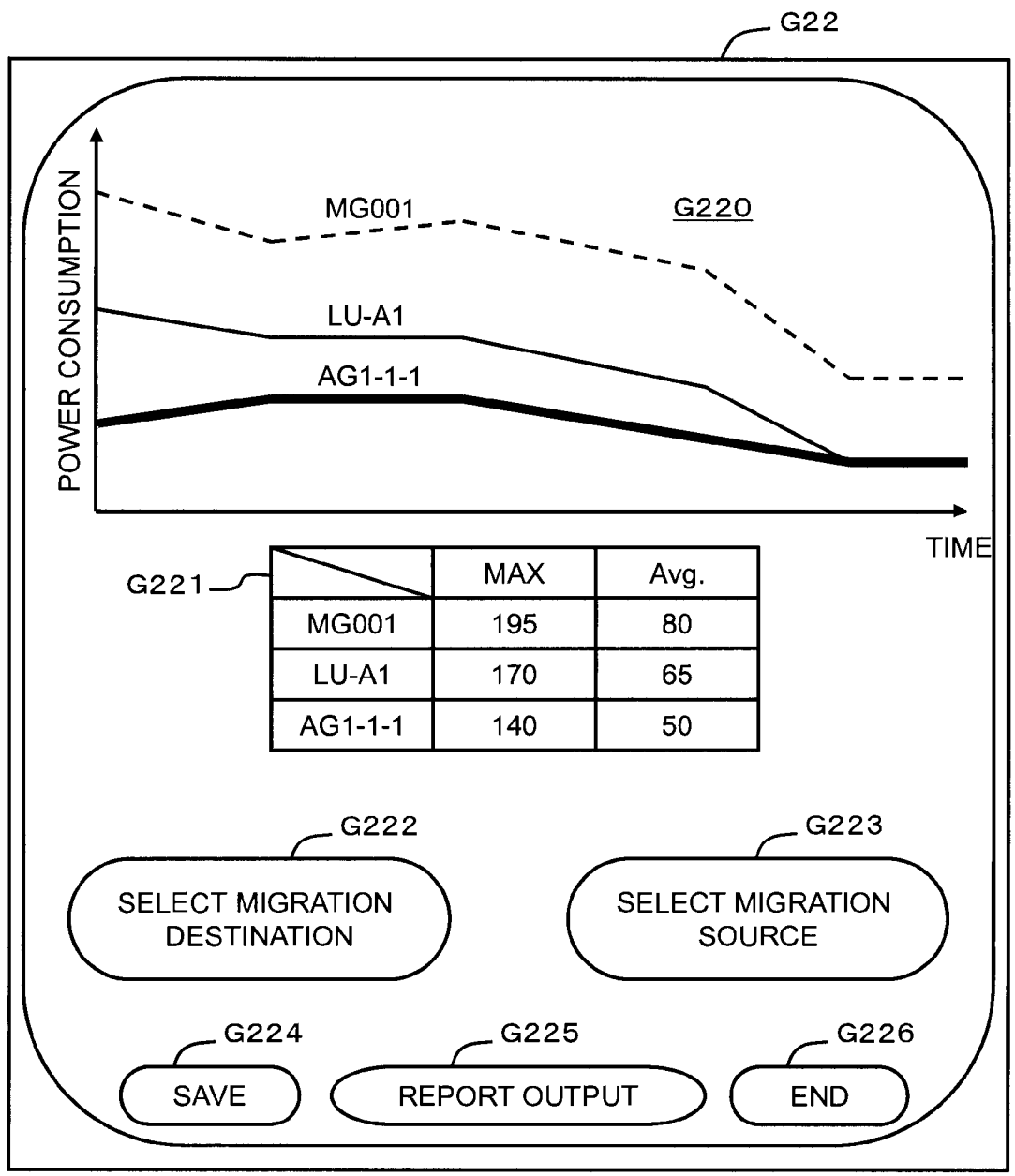
FIG. 25 is an example of a screen for graphically displaying and comparing variations in power consumption in the migration source and the migration destination.

FIG. 25 shows a screen G22 for comparing power consumption. The power consumption comparison screen G22, for example, comprises a graph display portion G220; a table display portion G221; a button G222 for selecting the migration destination; a button G223 for selecting the migration source; a save button G224; a report output button G225; and an end button G226.

The graph display portion G220 graphically displays temporal variations in the power consumption of the migration-source logical volume (LU-A1) and/or the migration group (MG001), and the temporal variations in the power consumption of the migration-destination array group (AG1-1-1).

The table display portion G221 numerically displays the power consumption maximum values and average values for the migration-source logical volume (LU-A1) and/or the migration group (MG001), and the migration-destination array group (AG1-1-1).

The button G222 is for selecting the migration destination. The button G223 is for selecting the migration source. The save button G224 is for saving a comparison result. The report output button G225 is for outputting the results of a power consumption comparison as either printed matter or as a digital file.

Configuring this embodiment like this also achieves the same effects as those of the first embodiment. Furthermore, this embodiment makes it possible to graphically visualize variations in migration-source power consumption and variations in migration-destination power consumption. Therefore, it is possible to support a plan for a minimal power consumption data migration, enhancing user usability.

[Fourth Embodiment]

A fourth embodiment will be explained based on FIG. 26. In this embodiment, an array group to be a migration destination candidate is automatically retrieved and provided to the user so that array groups 220 having different I/O characteristics are intermixed inside the storage apparatuses 10.

Figure 26:
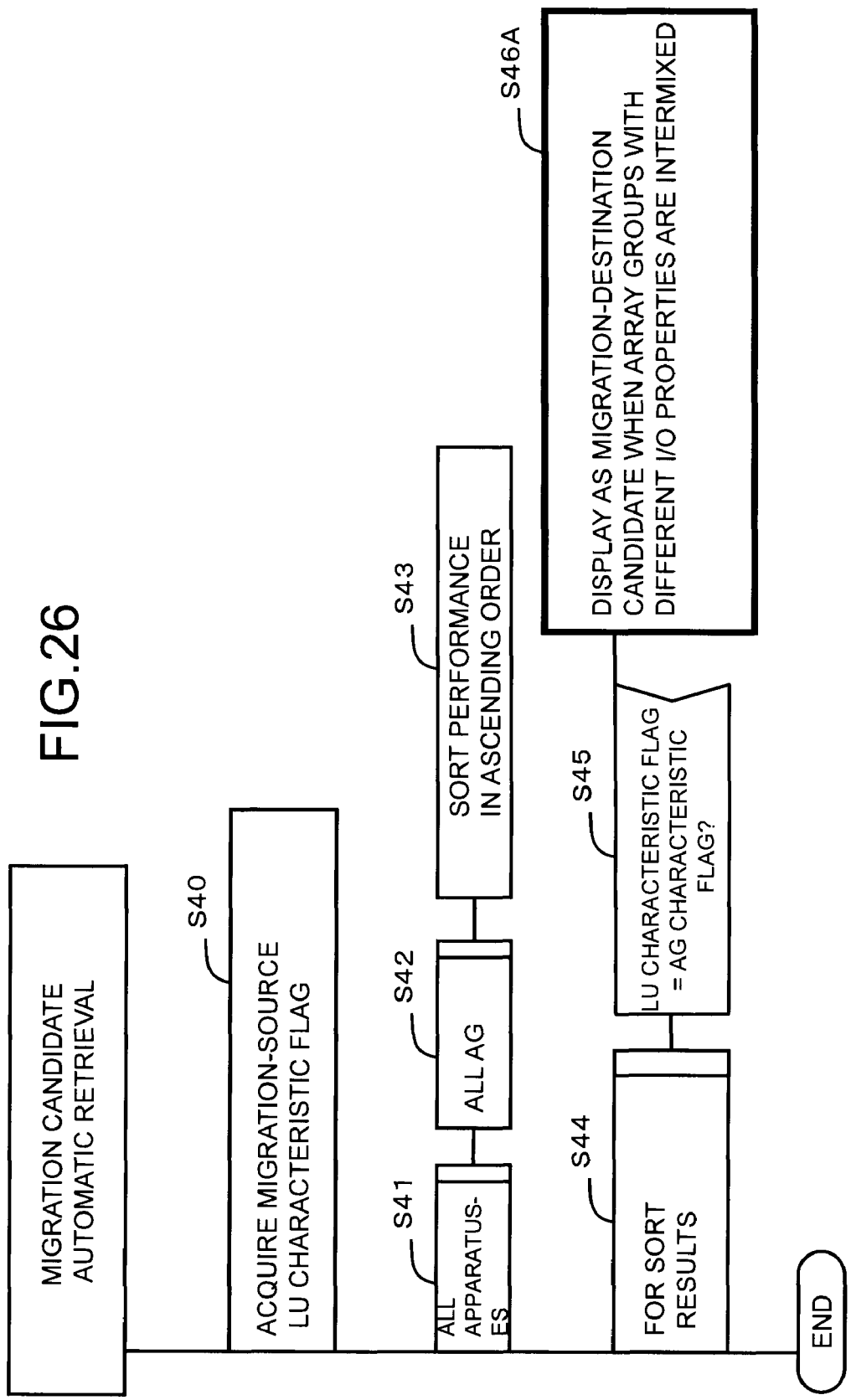
FIG. 26 is a PAD diagram showing the process for a migration-destination candidate automatic retrieval that is executed by the data migration management apparatus related to a fourth embodiment.

FIG. 26 is a PAD diagram shown the automatic retrieval process for a migration-destination candidate executed by the management server 20 of this embodiment. This processing comprises the respective steps S40 through S45 shown in FIG. 18. Furthermore, in this embodiment, a new step S46A is provided in place of S46.

The management server 20 extracts an array group 220 having a characteristic flag that matches the characteristic flag of the migration-source logical volume 230 (S45). The management server 20 determines whether or not an array group having a different characteristic flag is suitably intermixed inside the storage apparatus 10 to which the extracted array group 220 belongs, and in a case where this intermixing is present, selects the array group 220 extracted in S45 as a migration-destination candidate (S46A).

That is, the management server 20 determines whether or not array groups having different I/O characteristics are intermixed at a predetermined ratio inside a single storage apparatus 10. For example, a case in which a certain storage apparatus 10 possesses more than a predetermined ratio of array groups 220 that are accessed at high frequency during the daytime will be considered.

In this case, if a logical volume 230 that is accessed at high frequency during the daytime is migrated inside the storage apparatus 10, there is the likelihood that the communication ports of the controller 100 will become congested during daytime hours, causing response performance to drop.

This same problem also occurs when a logical volume 230 that is accessed at high frequency during the nighttime is migrated inside a storage apparatus 10 in a case where this storage apparatus 10 possesses more than a predetermined ratio of array groups 220 that are accessed at high frequency during the nighttime. Accordingly, in this embodiment, the retrieval of a migration-destination candidate is conducted such that array groups 220 having different I/O characteristics are dispersed inside a single storage apparatus 10.

Configuring this embodiment like this also achieves the same effects as those of the first embodiment and second embodiment. In addition, in this embodiment, a migration-destination candidate is retrieved and provided to the user such that array groups 220 having different I/O characteristics are suitably intermixed inside a single storage apparatus 10. Therefore, it is possible to curb the biasing of I/O characteristics in a storage apparatus 10 and to relieve communication port congestion, making it possible to enhance the response performance of the storage apparatuses 10.

The present invention is not limited to the respective embodiments described hereinabove. A person with ordinary skill in the art should be able to make various additions and changes without departing from the scope of the present invention.

What is claimed is:

1. A data migration management apparatus for managing a data migration in a storage system that comprises a plurality of storage areas, comprising:
    an information management unit for coupling to the storage system;
    a memory for storing a database that stores utilization status information indicating an access frequency for each instant of time of the plurality of storage areas, which is acquired via the information management unit; and
    a processor for referencing the database,
    wherein, the processor is configured to detect, based on the utilization status information managed by the information management unit, a variation in the utilization status information during a predetermined period in a prescribed storage area related to the data migration of the storage areas, and is configured to provide the variation in the utilization status information to a user computer via a performance information provision unit,
    and wherein the performance information provision unit is configured to provide, to the user computer, a migration-destination storage area candidate for data stored in a predetermined storage area based on the utilization status information indicating the predetermined storage area is changed, and
    wherein when the selection of the migration-destination storage area candidate of the data is received from the user computer, the processor is configured to perform the data migration.

2. A data migration management apparatus according to claim 1, wherein the processor is configured to provide the migration-source status variation and the migration-destination status variation to the user computer to enable the display and comparison of these status variations on the same screen of the user computer.

3. A data migration management apparatus according to claim 1, wherein the utilization status information further comprises data size per one access, and wherein the access frequency is the frequency at which read requests and write requests are issued to the storage areas.

4. A data migration management apparatus according to claim 3,
    wherein the utilization status information comprises power consumption of the storage areas, and
    wherein the processor is configured to provide a variation in the power consumption of the prescribed storage area during the predetermined period to the user computer.

5. A data migration management apparatus according to claim 1,
    wherein an array group comprising a plurality of storage areas can be selected as the prescribed storage area, and
    wherein the processor is configured to provide, to the user computer via the performance information provision unit, the variations in the utilization status information during the predetermined period for the storage areas included in the array group as a whole, and the variation in the utilization status information during the predetermined period for each of the storage areas included in the group.

6. A data migration management apparatus according to claim 3,
    wherein the utilization status information comprises an issuance frequency of read request and write request for each instant of time with respect to each of the storage areas and access frequency information of data size for one access and access characteristics information which shows if the access to each of the storage areas is random access or serial access, and
    wherein the processor is configured to provide, to the user computer, the migration-destination storage area candidate which has access characteristics information that is close to the access characteristics information of the migration-source storage area.

7. A data migration management apparatus according to claim 6, wherein, in a case where a plurality of migration-destination storage area candidates exist, the processor is configured to retrieve the migration-destination storage area candidate in a storage system which includes more than a predetermined ratio of the storage areas whose access characteristics are different.

8. A management method for managing a data migration in a storage system that comprises a plurality of storage areas, the data migration management method comprising the steps of:

acquiring, by an information management unit, utilization status information indicating an access frequency for each instant of time of the plurality of storage areas, and storing and managing the utilization status information in a database;

detecting, on the basis of the utilization status information, a variation in a utilization status during a predetermined period in a prescribed storage area related to the data migration of the storage areas;

providing, by a performance information provision unit, the detected variation in the utilization status to a user computer; and providing, by the performance information provision unit, to the user computer, a migration-destination storage area candidate for data stored in aredetermined storage area based on the utilization status information indicating the predetermined storage area is changed, and wherein selection of the migration-destination storage area candidate of the data is received from the user computer, and data migration management unit performs the data migration.

9. A data migration management apparatus according to claim 6, wherein the processor is configured to provide the migration-destination storage area candidate that has access frequency information that is close to access frequency information of the migration source storage area when a plurality of migration-destination storage area candidates exist.

10. A data migration management apparatus according to claim 6, wherein the processor is configured to provide the migration-destination storage area candidate that has access frequency information that tends to be different from access frequency information of the migration source storage area when a plurality of migration-destination storage area candidates exist.

* * * * *